(12) United States Patent
Siman Tov et al.

(10) Patent No.: US 12,001,902 B2
(45) Date of Patent: Jun. 4, 2024

(54) CORRECTING DISTORTIONS IN DIGITAL PRINTING BY IMPLANTING DUMMY PIXELS IN A DIGITAL IMAGE

(71) Applicant: Landa Corporation Ltd., Rehovot (IL)

(72) Inventors: Alon Siman Tov, Or Yehuda (IL); Yoav Stein, Kiryat Ono (IL)

(73) Assignee: LANDA CORPORATION LTD., Rehovot (IL)

( * ) Notice: Subject to any disclaimer, the term of this patent is extended or adjusted under 35 U.S.C. 154(b) by 609 days.

(21) Appl. No.: 17/265,817

(22) PCT Filed: Aug. 8, 2019

(86) PCT No.: PCT/IB2019/056746
§ 371 (c)(1),
(2) Date: Feb. 4, 2021

(87) PCT Pub. No.: WO2020/035766
PCT Pub. Date: Feb. 20, 2020

(65) Prior Publication Data
US 2021/0309020 A1    Oct. 7, 2021

Related U.S. Application Data

(60) Provisional application No. 62/717,957, filed on Aug. 13, 2018.

(51) Int. Cl.
*B41J 2/21* (2006.01)
*G06K 15/02* (2006.01)
(Continued)

(52) U.S. Cl.
CPC ......... *G06K 15/1876* (2013.01); *G06K 15/02* (2013.01); *H04N 1/409* (2013.01); *H04N 1/58* (2013.01); *B41J 2/2135* (2013.01)

(58) Field of Classification Search
None
See application file for complete search history.

(56) References Cited

U.S. PATENT DOCUMENTS 2,839,181 A    6/1958  Renner
3,011,545 A    12/1961 Welsh et al.
(Continued)

FOREIGN PATENT DOCUMENTS

CN    1121033 A    4/1996
CN    1200085 A    11/1998
(Continued)

OTHER PUBLICATIONS

English translation of JP-2001005245-A (Patents Application H11-175002). (Year: 2001).*
(Continued)

*Primary Examiner* — Thomas D Lee
(74) *Attorney, Agent, or Firm* — Kligler & Associates Patent Attorneys Ltd.

(57) ABSTRACT

A method for correcting distortion in image printing, the method includes receiving a digital image (200, 306, 376, 500, 600, 700, 810) acquired from a printed image. Based on the digital image (200, 306, 376, 500, 600, 700, 810), a geometric distortion in the printed image is estimated. One or more pixel locations (228, 504, 506, 514, 610, 620, 630, 640, 712, 716, 722, 724) are calculated, such that, when one or more dummy pixels (232, 234) are implanted therein, compensate for the estimated geometric distortion. The geometric distortion is corrected in a subsequent digital image to be printed, by implanting the one or more dummy pixels (232, 234) at the one or more calculated pixel locations (228, 504, 506, 514, 610, 620, 630, 640, 712, 716,
(Continued)

722, 724) in the subsequent digital image. The subsequent digital image having the corrected geometric distortion is printed.

20 Claims, 7 Drawing Sheets

(51) Int. Cl.
*H04N 1/409* (2006.01)
*H04N 1/58* (2006.01)

(56) References Cited

U.S. PATENT DOCUMENTS

| | | |
|---|---|---|
| 3,053,319 A | 9/1962 | Cronin et al. |
| 3,697,551 A | 10/1972 | Thomson |
| 3,697,568 A | 10/1972 | Boissieras et al. |
| 3,889,802 A | 6/1975 | Jonkers |
| 3,898,670 A | 8/1975 | Erikson et al. |
| 3,947,113 A | 3/1976 | Buchan et al. |
| 4,009,958 A | 3/1977 | Kurita et al. |
| 4,093,764 A | 6/1978 | Duckett et al. |
| 4,172,231 A | 10/1979 | D'Alayer et al. |
| 4,293,866 A | 10/1981 | Takita et al. |
| 4,401,500 A | 8/1983 | Hamada et al. |
| 4,535,694 A | 8/1985 | Fukuda |
| 4,538,156 A | 8/1985 | Durkee et al. |
| 4,555,437 A | 11/1985 | Tanck |
| 4,575,465 A | 3/1986 | Viola |
| 4,586,807 A | 5/1986 | Yuasa |
| 4,642,654 A | 2/1987 | Toganoh et al. |
| 4,853,737 A | 8/1989 | Hartley et al. |
| 4,976,197 A | 12/1990 | Yamanari et al. |
| 5,012,072 A | 4/1991 | Martin et al. |
| 5,039,339 A | 8/1991 | Phan et al. |
| 5,062,364 A | 11/1991 | Lewis et al. |
| 5,075,731 A | 12/1991 | Kamimura et al. |
| 5,099,256 A | 3/1992 | Anderson |
| 5,106,417 A | 4/1992 | Hauser et al. |
| 5,109,275 A | 4/1992 | Naka et al. |
| 5,128,091 A | 7/1992 | Agur et al. |
| 5,190,582 A | 3/1993 | Shinozuka et al. |
| 5,198,835 A | 3/1993 | Ando et al. |
| 5,246,100 A | 9/1993 | Stone et al. |
| 5,264,904 A | 11/1993 | Audi et al. |
| 5,305,099 A | 4/1994 | Morcos |
| 5,320,214 A | 6/1994 | Kordis |
| 5,333,771 A | 8/1994 | Cesario |
| 5,349,905 A | 9/1994 | Taylor et al. |
| 5,352,507 A | 10/1994 | Bresson et al. |
| 5,365,324 A | 11/1994 | Gu et al. |
| 5,406,884 A | 4/1995 | Okuda et al. |
| 5,433,541 A | 7/1995 | Hieda et al. |
| 5,471,233 A | 11/1995 | Okamoto et al. |
| 5,532,314 A | 7/1996 | Sexsmith |
| 5,552,875 A | 9/1996 | Sagiv et al. |
| 5,575,873 A | 11/1996 | Pieper et al. |
| 5,587,779 A | 12/1996 | Heeren et al. |
| 5,608,004 A | 3/1997 | Toyoda et al. |
| 5,613,669 A | 3/1997 | Grueninger |
| 5,614,933 A | 3/1997 | Hindman et al. |
| 5,623,296 A | 4/1997 | Fujino et al. |
| 5,642,141 A | 6/1997 | Hale et al. |
| 5,660,108 A | 8/1997 | Pensavecchia |
| 5,677,719 A | 10/1997 | Granzow |
| 5,679,463 A | 10/1997 | Visser et al. |
| 5,683,841 A | 11/1997 | Kato |
| 5,698,018 A | 12/1997 | Bishop et al. |
| 5,723,242 A | 3/1998 | Woo et al. |
| 5,733,698 A | 3/1998 | Lehman et al. |
| 5,736,250 A | 4/1998 | Heeks et al. |
| 5,772,746 A | 6/1998 | Sawada et al. |
| 5,777,576 A | 7/1998 | Zur et al. |
| 5,777,650 A | 7/1998 | Blank |
| 5,780,412 A | 7/1998 | Scarborough et al. |
| 5,841,456 A | 11/1998 | Takei et al. |
| 5,859,076 A | 1/1999 | Kozma et al. |
| 5,865,299 A | 2/1999 | Williams |
| 5,880,214 A | 3/1999 | Okuda |
| 5,883,144 A | 3/1999 | Bambara et al. |
| 5,883,145 A | 3/1999 | Hurley et al. |
| 5,884,559 A | 3/1999 | Okubo et al. |
| 5,889,534 A | 3/1999 | Johnson et al. |
| 5,891,934 A | 4/1999 | Moffatt et al. |
| 5,895,711 A | 4/1999 | Yamaki et al. |
| 5,902,841 A | 5/1999 | Jaeger et al. |
| 5,923,929 A | 7/1999 | Ben et al. |
| 5,929,129 A | 7/1999 | Feichtinger |
| 5,932,659 A | 8/1999 | Bambara et al. |
| 5,935,751 A | 8/1999 | Matsuoka et al. |
| 5,978,631 A | 11/1999 | Lee |
| 5,978,638 A | 11/1999 | Tanaka et al. |
| 5,991,590 A | 11/1999 | Chang et al. |
| 6,004,647 A | 12/1999 | Bambara et al. |
| 6,009,284 A | 12/1999 | Weinberger et al. |
| 6,024,018 A | 2/2000 | Darel et al. |
| 6,024,786 A | 2/2000 | Gore |
| 6,033,049 A | 3/2000 | Fukuda |
| 6,045,817 A | 4/2000 | Ananthapadmanabhan et al. |
| 6,048,114 A | 4/2000 | De Troz |
| 6,053,438 A | 4/2000 | Romano, Jr. et al. |
| 6,055,396 A | 4/2000 | Pang |
| 6,059,407 A | 5/2000 | Komatsu et al. |
| 6,071,368 A | 6/2000 | Boyd et al. |
| 6,072,976 A | 6/2000 | Kuriyama et al. |
| 6,078,775 A | 6/2000 | Arai et al. |
| 6,094,558 A | 7/2000 | Shimizu et al. |
| 6,102,538 A | 8/2000 | Ochi et al. |
| 6,103,775 A | 8/2000 | Bambara et al. |
| 6,108,513 A | 8/2000 | Landa et al. |
| 6,109,746 A | 8/2000 | Jeanmaire et al. |
| 6,132,541 A | 10/2000 | Heaton |
| 6,143,807 A | 11/2000 | Lin et al. |
| 6,166,105 A | 12/2000 | Santilli et al. |
| 6,195,112 B1 | 2/2001 | Fassler et al. |
| 6,196,674 B1 | 3/2001 | Takemoto |
| 6,213,580 B1 | 4/2001 | Segerstrom et al. |
| 6,214,894 B1 | 4/2001 | Bambara et al. |
| 6,221,928 B1 | 4/2001 | Kozma et al. |
| 6,234,625 B1 | 5/2001 | Wen |
| 6,242,503 B1 | 6/2001 | Kozma et al. |
| 6,257,716 B1 | 7/2001 | Yanagawa et al. |
| 6,261,688 B1 | 7/2001 | Kaplan et al. |
| 6,262,137 B1 | 7/2001 | Kozma et al. |
| 6,262,207 B1 | 7/2001 | Rao et al. |
| 6,303,215 B1 | 10/2001 | Sonobe et al. |
| 6,316,512 B1 | 11/2001 | Bambara et al. |
| 6,318,853 B1 | 11/2001 | Asano et al. |
| 6,332,943 B1 | 12/2001 | Herrmann et al. |
| 6,335,046 B1 | 1/2002 | Mackey |
| 6,354,700 B1 | 3/2002 | Roth |
| 6,357,869 B1 | 3/2002 | Rasmussen et al. |
| 6,357,870 B1 | 3/2002 | Beach et al. |
| 6,358,660 B1 | 3/2002 | Agler et al. |
| 6,363,234 B2 | 3/2002 | Landa et al. |
| 6,364,451 B1 | 4/2002 | Silverbrook |
| 6,377,772 B1 | 4/2002 | Chowdry et al. |
| 6,383,278 B1 | 5/2002 | Hirasa et al. |
| 6,386,697 B1 | 5/2002 | Yamamoto et al. |
| 6,390,617 B1 | 5/2002 | Iwao |
| 6,396,528 B1 | 5/2002 | Yanagawa |
| 6,397,034 B1 | 5/2002 | Tarnawskyj et al. |
| 6,400,913 B1 | 6/2002 | De et al. |
| 6,402,317 B2 | 6/2002 | Yanagawa et al. |
| 6,405,006 B1 | 6/2002 | Tabuchi |
| 6,409,331 B1 | 6/2002 | Gelbart |
| 6,432,501 B1 | 8/2002 | Yang et al. |
| 6,438,352 B1 | 8/2002 | Landa et al. |
| 6,454,378 B1 | 9/2002 | Silverbrook et al. |
| 6,471,803 B1 | 10/2002 | Pelland et al. |
| 6,530,321 B2 | 3/2003 | Andrew et al. |
| 6,530,657 B2 | 3/2003 | Polierer |
| 6,531,520 B1 | 3/2003 | Bambara et al. |
| 6,551,394 B2 | 4/2003 | Hirasa et al. |

(56) References Cited

U.S. PATENT DOCUMENTS

| | | |
|---|---|---|
| 6,551,716 B1 | 4/2003 | Landa et al. |
| 6,554,189 B1 | 4/2003 | Good et al. |
| 6,559,969 B1 | 5/2003 | Lapstun |
| 6,575,547 B2 | 6/2003 | Sakuma |
| 6,586,100 B1 | 7/2003 | Pickering et al. |
| 6,590,012 B2 | 7/2003 | Miyabayashi |
| 6,605,919 B1 | 8/2003 | Branecky |
| 6,608,979 B1 | 8/2003 | Landa et al. |
| 6,623,817 B1 | 9/2003 | Yang et al. |
| 6,630,047 B2 | 10/2003 | Jing et al. |
| 6,633,735 B2 | 10/2003 | Kellie et al. |
| 6,639,527 B2 | 10/2003 | Johnson |
| 6,648,468 B2 | 11/2003 | Shinkoda et al. |
| 6,678,068 B1 | 1/2004 | Richter et al. |
| 6,682,189 B2 | 1/2004 | May et al. |
| 6,685,769 B1 | 2/2004 | Karl et al. |
| 6,704,535 B2 | 3/2004 | Kobayashi et al. |
| 6,709,096 B1 | 3/2004 | Beach et al. |
| 6,716,562 B2 | 4/2004 | Uehara et al. |
| 6,719,423 B2 | 4/2004 | Chowdry et al. |
| 6,720,367 B2 | 4/2004 | Taniguchi et al. |
| 6,755,519 B2 | 6/2004 | Gelbart et al. |
| 6,761,446 B2 | 7/2004 | Chowdry et al. |
| 6,770,331 B1 | 8/2004 | Mielke et al. |
| 6,789,887 B2 | 9/2004 | Yang et al. |
| 6,811,840 B1 | 11/2004 | Cross |
| 6,827,018 B1 | 12/2004 | Hartmann et al. |
| 6,881,458 B2 | 4/2005 | Ludwig et al. |
| 6,898,403 B2 | 5/2005 | Baker et al. |
| 6,912,952 B1 | 7/2005 | Landa et al. |
| 6,916,862 B2 | 7/2005 | Ota et al. |
| 6,917,437 B1 | 7/2005 | Myers et al. |
| 6,966,712 B2 | 11/2005 | Trelewicz et al. |
| 6,970,674 B2 | 11/2005 | Sato et al. |
| 6,974,022 B2 | 12/2005 | Saeki |
| 6,982,799 B2 | 1/2006 | Lapstun |
| 6,983,692 B2 | 1/2006 | Beauchamp et al. |
| 7,025,453 B2 | 4/2006 | Ylitalo et al. |
| 7,057,760 B2 | 6/2006 | Lapstun et al. |
| 7,084,202 B2 | 8/2006 | Pickering et al. |
| 7,128,412 B2 | 10/2006 | King et al. |
| 7,129,858 B2 | 10/2006 | Ferran et al. |
| 7,134,953 B2 | 11/2006 | Reinke |
| 7,160,377 B2 | 1/2007 | Zoch et al. |
| 7,204,584 B2 | 4/2007 | Lean et al. |
| 7,213,900 B2 | 5/2007 | Ebihara |
| 7,224,478 B1 | 5/2007 | Lapstun et al. |
| 7,265,819 B2 | 9/2007 | Raney |
| 7,271,213 B2 | 9/2007 | Hoshida et al. |
| 7,296,882 B2 | 11/2007 | Buehler et al. |
| 7,300,133 B1 | 11/2007 | Folkins et al. |
| 7,300,147 B2 | 11/2007 | Johnson |
| 7,304,753 B1 | 12/2007 | Richter et al. |
| 7,322,689 B2 | 1/2008 | Kohne et al. |
| 7,334,520 B2 | 2/2008 | Geissler et al. |
| 7,348,368 B2 | 3/2008 | Kakiuchi et al. |
| 7,360,887 B2 | 4/2008 | Konno |
| 7,362,464 B2 | 4/2008 | Kitazawa |
| 7,459,491 B2 | 12/2008 | Tyvoll et al. |
| 7,527,359 B2 | 5/2009 | Stevenson et al. |
| 7,575,314 B2 | 8/2009 | Desie et al. |
| 7,612,125 B2 | 11/2009 | Muller et al. |
| 7,655,707 B2 | 2/2010 | Ma |
| 7,655,708 B2 | 2/2010 | House et al. |
| 7,699,922 B2 | 4/2010 | Breton et al. |
| 7,708,371 B2 | 5/2010 | Yamanobe |
| 7,709,074 B2 | 5/2010 | Uchida et al. |
| 7,712,890 B2 | 5/2010 | Yahiro |
| 7,732,543 B2 | 6/2010 | Loch et al. |
| 7,732,583 B2 | 6/2010 | Annoura et al. |
| 7,808,670 B2 | 10/2010 | Lapstun et al. |
| 7,810,922 B2 | 10/2010 | Gervasi et al. |
| 7,845,788 B2 | 12/2010 | Oku |
| 7,867,327 B2 | 1/2011 | Sano et al. |
| 7,876,345 B2 | 1/2011 | Houjou |
| 7,910,183 B2 | 3/2011 | Wu |
| 7,911,644 B2 | 3/2011 | Shiokawa |
| 7,919,544 B2 | 4/2011 | Matsuyama et al. |
| 7,942,516 B2 | 5/2011 | Ohara et al. |
| 7,977,408 B2 | 7/2011 | Matsuyama et al. |
| 7,985,784 B2 | 7/2011 | Kanaya et al. |
| 8,002,400 B2 | 8/2011 | Kibayashi et al. |
| 8,012,538 B2 | 9/2011 | Yokouchi |
| 8,025,389 B2 | 9/2011 | Yamanobe et al. |
| 8,038,284 B2 | 10/2011 | Hori et al. |
| 8,041,275 B2 | 10/2011 | Soria et al. |
| 8,042,906 B2 | 10/2011 | Chiwata et al. |
| 8,059,309 B2 | 11/2011 | Lapstun et al. |
| 8,095,054 B2 | 1/2012 | Nakamura |
| 8,109,595 B2 | 2/2012 | Tanaka et al. |
| 8,119,315 B1 | 2/2012 | Heuft et al. |
| 8,122,846 B2 | 2/2012 | Stiblert et al. |
| 8,147,055 B2 | 4/2012 | Cellura et al. |
| 8,162,428 B2 | 4/2012 | Eun et al. |
| 8,177,351 B2 | 5/2012 | Taniuchi et al. |
| 8,184,347 B2 | 5/2012 | Bradley |
| 8,186,820 B2 | 5/2012 | Chiwata |
| 8,192,904 B2 | 6/2012 | Nagai et al. |
| 8,215,762 B2 | 7/2012 | Ageishi |
| 8,242,201 B2 | 8/2012 | Goto et al. |
| 8,256,857 B2 | 9/2012 | Folkins et al. |
| 8,263,683 B2 | 9/2012 | Gibson et al. |
| 8,264,135 B2 | 9/2012 | Ozolins et al. |
| 8,295,733 B2 | 10/2012 | Imoto |
| 8,303,071 B2 | 11/2012 | Eun |
| 8,303,072 B2 | 11/2012 | Shibata et al. |
| 8,304,043 B2 | 11/2012 | Nagashima et al. |
| 8,353,589 B2 | 1/2013 | Ikeda et al. |
| 8,434,847 B2 | 5/2013 | Dejong et al. |
| 8,460,450 B2 | 6/2013 | Taverizatshy et al. |
| 8,469,476 B2 | 6/2013 | Mandel et al. |
| 8,474,963 B2 | 7/2013 | Hasegawa et al. |
| 8,536,268 B2 | 9/2013 | Karjala et al. |
| 8,546,466 B2 | 10/2013 | Yamashita et al. |
| 8,556,400 B2 | 10/2013 | Yatake et al. |
| 8,693,032 B2 | 4/2014 | Goddard et al. |
| 8,711,304 B2 | 4/2014 | Mathew et al. |
| 8,714,731 B2 | 5/2014 | Leung et al. |
| 8,746,873 B2 | 6/2014 | Tsukamoto et al. |
| 8,779,027 B2 | 7/2014 | Idemura et al. |
| 8,802,221 B2 | 8/2014 | Noguchi et al. |
| 8,867,097 B2 | 10/2014 | Mizuno |
| 8,885,218 B2 | 11/2014 | Hirose |
| 8,891,128 B2 | 11/2014 | Yamazaki |
| 8,894,198 B2 | 11/2014 | Hook et al. |
| 8,919,946 B2 | 12/2014 | Suzuki et al. |
| 9,004,629 B2 | 4/2015 | De Jong et al. |
| 9,186,884 B2 | 11/2015 | Landa et al. |
| 9,207,585 B2 | 12/2015 | Hatano et al. |
| 9,227,429 B1 | 1/2016 | LeStrange et al. |
| 9,229,664 B2 | 1/2016 | Landa et al. |
| 9,264,559 B2 | 2/2016 | Motoyanagi et al. |
| 9,284,469 B2 | 3/2016 | Song et al. |
| 9,290,016 B2 | 3/2016 | Landa et al. |
| 9,327,496 B2 | 5/2016 | Landa et al. |
| 9,327,519 B1 | 5/2016 | Larson et al. |
| 9,353,273 B2 | 5/2016 | Landa et al. |
| 9,381,736 B2 | 7/2016 | Landa et al. |
| 9,446,586 B2 | 9/2016 | Matos et al. |
| 9,498,946 B2 | 11/2016 | Landa et al. |
| 9,505,208 B2 | 11/2016 | Shmaiser et al. |
| 9,517,618 B2 | 12/2016 | Landa et al. |
| 9,566,780 B2 | 2/2017 | Landa et al. |
| 9,568,862 B2 | 2/2017 | Shmaiser et al. |
| 9,643,400 B2 | 5/2017 | Landa et al. |
| 9,643,403 B2 | 5/2017 | Landa et al. |
| 9,776,391 B2 | 10/2017 | Landa et al. |
| 9,782,993 B2 | 10/2017 | Landa et al. |
| 9,849,667 B2 | 12/2017 | Landa et al. |
| 9,884,479 B2 | 2/2018 | Landa et al. |
| 9,902,147 B2 | 2/2018 | Shmaiser et al. |
| 9,914,316 B2 | 3/2018 | Landa et al. |
| 10,065,411 B2 | 9/2018 | Landa et al. |
| 10,175,613 B2 | 1/2019 | Watanabe |

(56) References Cited

U.S. PATENT DOCUMENTS

| | | |
|---|---|---|
| 10,179,447 B2 | 1/2019 | Shmaiser et al. |
| 10,190,012 B2 | 1/2019 | Landa et al. |
| 10,195,843 B2 | 2/2019 | Landa et al. |
| 10,201,968 B2 | 2/2019 | Landa et al. |
| 10,226,920 B2 | 3/2019 | Shmaiser et al. |
| 10,266,711 B2 | 4/2019 | Landa et al. |
| 10,289,874 B2 | 5/2019 | Smith |
| 10,300,690 B2 | 5/2019 | Landa et al. |
| 10,357,963 B2 | 7/2019 | Landa et al. |
| 10,357,985 B2 | 7/2019 | Landa et al. |
| 10,427,399 B2 | 10/2019 | Shmaiser et al. |
| 10,434,761 B2 | 10/2019 | Landa et al. |
| 10,477,188 B2 | 11/2019 | Stiglic et al. |
| 10,518,526 B2 | 12/2019 | Landa et al. |
| 10,569,532 B2 | 2/2020 | Shmaiser et al. |
| 10,569,533 B2 | 2/2020 | Landa et al. |
| 10,569,534 B2 | 2/2020 | Shmaiser et al. |
| 10,576,734 B2 | 3/2020 | Landa et al. |
| 10,596,804 B2 | 3/2020 | Landa et al. |
| 10,632,740 B2 | 4/2020 | Landa et al. |
| 10,642,198 B2 | 5/2020 | Landa et al. |
| 10,703,094 B2 | 7/2020 | Shmaiser et al. |
| 10,730,333 B2 | 8/2020 | Landa et al. |
| 10,759,953 B2 | 9/2020 | Landa et al. |
| 10,800,936 B2 | 10/2020 | Landa et al. |
| 10,828,888 B2 | 11/2020 | Landa et al. |
| 10,889,128 B2 | 1/2021 | Landa et al. |
| 10,926,532 B2 | 2/2021 | Chechik et al. |
| 10,933,661 B2 | 3/2021 | Landa et al. |
| 10,960,660 B2 | 3/2021 | Landa et al. |
| 10,981,377 B2 | 4/2021 | Landa et al. |
| 10,994,528 B1 | 5/2021 | Burkatovsky |
| 11,318,734 B2 | 5/2022 | Chechik et al. |
| 11,655,382 B2 | 5/2023 | Landa et al. |
| 2001/0022607 A1 | 9/2001 | Takahashi et al. |
| 2001/0033688 A1 | 10/2001 | Taylor |
| 2002/0041317 A1 | 4/2002 | Kashiwazaki et al. |
| 2002/0061451 A1 | 5/2002 | Kita et al. |
| 2002/0064404 A1 | 5/2002 | Iwai |
| 2002/0102374 A1 | 8/2002 | Gervasi et al. |
| 2002/0121220 A1 | 9/2002 | Lin |
| 2002/0150408 A1 | 10/2002 | Mosher et al. |
| 2002/0164494 A1 | 11/2002 | Grant et al. |
| 2002/0197481 A1 | 12/2002 | Jing et al. |
| 2003/0004025 A1 | 1/2003 | Okuno et al. |
| 2003/0007055 A1 | 1/2003 | Ogawa |
| 2003/0018119 A1 | 1/2003 | Frenkel et al. |
| 2003/0030686 A1 | 2/2003 | Abe et al. |
| 2003/0032700 A1 | 2/2003 | Morrison et al. |
| 2003/0041777 A1 | 3/2003 | Karl et al. |
| 2003/0043258 A1 | 3/2003 | Kerr et al. |
| 2003/0049065 A1 | 3/2003 | Barrus et al. |
| 2003/0054139 A1 | 3/2003 | Ylitalo et al. |
| 2003/0055129 A1 | 3/2003 | Alford |
| 2003/0063179 A1 | 4/2003 | Adachi |
| 2003/0064317 A1 | 4/2003 | Bailey et al. |
| 2003/0081964 A1 | 5/2003 | Shimura et al. |
| 2003/0118381 A1 | 6/2003 | Law et al. |
| 2003/0129435 A1 | 7/2003 | Blankenship et al. |
| 2003/0175602 A1* | 9/2003 | Kazama ............ H04N 1/00031 430/30 |
| 2003/0186147 A1 | 10/2003 | Pickering et al. |
| 2003/0214568 A1 | 11/2003 | Nishikawa et al. |
| 2003/0234849 A1 | 12/2003 | Pan et al. |
| 2004/0003863 A1 | 1/2004 | Eckhardt |
| 2004/0020382 A1 | 2/2004 | McLean et al. |
| 2004/0036758 A1 | 2/2004 | Sasaki et al. |
| 2004/0047666 A1 | 3/2004 | Imaizumi et al. |
| 2004/0087707 A1 | 5/2004 | Zoch et al. |
| 2004/0123761 A1 | 7/2004 | Szumla et al. |
| 2004/0124831 A1 | 7/2004 | Micke et al. |
| 2004/0125188 A1 | 7/2004 | Szumla et al. |
| 2004/0145643 A1 | 7/2004 | Nakamura |
| 2004/0173111 A1 | 9/2004 | Okuda |
| 2004/0200369 A1 | 10/2004 | Brady |
| 2004/0221943 A1 | 11/2004 | Yu et al. |
| 2004/0228642 A1 | 11/2004 | Iida et al. |
| 2004/0246324 A1 | 12/2004 | Nakashima |
| 2004/0246326 A1 | 12/2004 | Dwyer et al. |
| 2004/0252175 A1 | 12/2004 | Bejat et al. |
| 2004/0265016 A1 | 12/2004 | Kitani et al. |
| 2005/0031807 A1 | 2/2005 | Quintens et al. |
| 2005/0082146 A1 | 4/2005 | Axmann |
| 2005/0110855 A1 | 5/2005 | Taniuchi et al. |
| 2005/0111861 A1 | 5/2005 | Calamita et al. |
| 2005/0134874 A1 | 6/2005 | Overall et al. |
| 2005/0150408 A1 | 7/2005 | Hesterman |
| 2005/0185009 A1 | 8/2005 | Claramunt et al. |
| 2005/0195235 A1 | 9/2005 | Kitao |
| 2005/0235870 A1 | 10/2005 | Ishihara |
| 2005/0266332 A1 | 12/2005 | Pavlisko et al. |
| 2005/0272334 A1 | 12/2005 | Wang et al. |
| 2006/0004123 A1 | 1/2006 | Wu et al. |
| 2006/0066704 A1 | 3/2006 | Nishida |
| 2006/0120740 A1 | 6/2006 | Yamada et al. |
| 2006/0135709 A1 | 6/2006 | Hasegawa et al. |
| 2006/0164488 A1 | 7/2006 | Taniuchi et al. |
| 2006/0164489 A1 | 7/2006 | Vega et al. |
| 2006/0192827 A1 | 8/2006 | Takada et al. |
| 2006/0233578 A1 | 10/2006 | Maki et al. |
| 2006/0286462 A1 | 12/2006 | Jackson et al. |
| 2007/0014595 A1 | 1/2007 | Kawagoe |
| 2007/0025768 A1 | 2/2007 | Komatsu et al. |
| 2007/0029171 A1 | 2/2007 | Nemedi |
| 2007/0045939 A1 | 3/2007 | Toya et al. |
| 2007/0054981 A1 | 3/2007 | Yanagi et al. |
| 2007/0064077 A1 | 3/2007 | Konno |
| 2007/0077520 A1 | 4/2007 | Maemoto |
| 2007/0120927 A1 | 5/2007 | Snyder et al. |
| 2007/0123642 A1 | 5/2007 | Banning et al. |
| 2007/0134030 A1 | 6/2007 | Lior et al. |
| 2007/0139734 A1 | 6/2007 | Fan et al. |
| 2007/0144368 A1 | 6/2007 | Barazani et al. |
| 2007/0146462 A1 | 6/2007 | Taniuchi et al. |
| 2007/0147894 A1 | 6/2007 | Yokota et al. |
| 2007/0166071 A1 | 7/2007 | Shima |
| 2007/0176995 A1 | 8/2007 | Kadomatsu et al. |
| 2007/0189819 A1 | 8/2007 | Uehara et al. |
| 2007/0195348 A1* | 8/2007 | Gerrits .................. H04N 1/387 358/1.9 |
| 2007/0199457 A1 | 8/2007 | Cyman et al. |
| 2007/0229639 A1 | 10/2007 | Yahiro |
| 2007/0253726 A1 | 11/2007 | Kagawa |
| 2007/0257955 A1 | 11/2007 | Tanaka et al. |
| 2007/0285486 A1 | 12/2007 | Harris et al. |
| 2008/0006176 A1 | 1/2008 | Houjou |
| 2008/0030536 A1 | 2/2008 | Furukawa et al. |
| 2008/0032072 A1 | 2/2008 | Taniuchi et al. |
| 2008/0044587 A1 | 2/2008 | Maeno et al. |
| 2008/0053327 A1 | 3/2008 | Weilacher |
| 2008/0055356 A1 | 3/2008 | Yamanobe |
| 2008/0055381 A1 | 3/2008 | Doi et al. |
| 2008/0074462 A1 | 3/2008 | Hirakawa |
| 2008/0112912 A1 | 5/2008 | Springob et al. |
| 2008/0124158 A1 | 5/2008 | Folkins |
| 2008/0137914 A1 | 6/2008 | Minhas |
| 2008/0138546 A1 | 6/2008 | Soria et al. |
| 2008/0166495 A1 | 7/2008 | Maeno et al. |
| 2008/0167185 A1 | 7/2008 | Hirota |
| 2008/0175612 A1 | 7/2008 | Oikawa et al. |
| 2008/0196612 A1 | 8/2008 | Rancourt et al. |
| 2008/0196621 A1 | 8/2008 | Ikuno et al. |
| 2008/0213548 A1 | 9/2008 | Koganehira et al. |
| 2008/0236480 A1 | 10/2008 | Furukawa et al. |
| 2008/0253812 A1 | 10/2008 | Pearce et al. |
| 2009/0022504 A1 | 1/2009 | Kuwabara et al. |
| 2009/0039583 A1 | 2/2009 | Horn et al. |
| 2009/0041515 A1 | 2/2009 | Kim |
| 2009/0041932 A1 | 2/2009 | Ishizuka et al. |
| 2009/0064884 A1 | 3/2009 | Hook et al. |
| 2009/0074492 A1 | 3/2009 | Ito |
| 2009/0082503 A1 | 3/2009 | Yanagi et al. |
| 2009/0087565 A1 | 4/2009 | Houjou |
| 2009/0098385 A1 | 4/2009 | Kaemper et al. |

(56) References Cited

U.S. PATENT DOCUMENTS

| | | |
|---|---|---|
| 2009/0116885 A1 | 5/2009 | Ando |
| 2009/0148200 A1 | 6/2009 | Hara et al. |
| 2009/0165937 A1 | 7/2009 | Inoue et al. |
| 2009/0185204 A1 | 7/2009 | Wu et al. |
| 2009/0190951 A1 | 7/2009 | Torimaru et al. |
| 2009/0196670 A1 | 8/2009 | McNestry et al. |
| 2009/0202275 A1 | 8/2009 | Nishida et al. |
| 2009/0211490 A1 | 8/2009 | Ikuno et al. |
| 2009/0220873 A1 | 9/2009 | Enomoto et al. |
| 2009/0237479 A1 | 9/2009 | Yamashita et al. |
| 2009/0256896 A1 | 10/2009 | Scarlata |
| 2009/0279170 A1 | 11/2009 | Miyazaki et al. |
| 2009/0279780 A1 | 11/2009 | Matsui |
| 2009/0315926 A1 | 12/2009 | Yamanobe |
| 2009/0317555 A1 | 12/2009 | Hori |
| 2009/0318591 A1 | 12/2009 | Ageishi et al. |
| 2010/0012023 A1 | 1/2010 | Lefevre et al. |
| 2010/0053292 A1 | 3/2010 | Thayer et al. |
| 2010/0053293 A1 | 3/2010 | Thayer et al. |
| 2010/0066796 A1 | 3/2010 | Yanagi et al. |
| 2010/0075843 A1 | 3/2010 | Ikuno et al. |
| 2010/0086692 A1 | 4/2010 | Ohta et al. |
| 2010/0091064 A1 | 4/2010 | Araki et al. |
| 2010/0141985 A1 | 6/2010 | Noy et al. |
| 2010/0225695 A1 | 9/2010 | Fujikura |
| 2010/0231623 A1 | 9/2010 | Hirato |
| 2010/0239789 A1 | 9/2010 | Umeda |
| 2010/0245511 A1 | 9/2010 | Ageishi |
| 2010/0247171 A1 | 9/2010 | Ono et al. |
| 2010/0282100 A1 | 11/2010 | Okuda et al. |
| 2010/0285221 A1 | 11/2010 | Oki et al. |
| 2010/0300604 A1 | 12/2010 | Goss et al. |
| 2010/0303504 A1 | 12/2010 | Funamoto et al. |
| 2010/0310281 A1 | 12/2010 | Miura et al. |
| 2011/0044724 A1 | 2/2011 | Funamoto et al. |
| 2011/0058001 A1 | 3/2011 | Gila et al. |
| 2011/0058859 A1 | 3/2011 | Nakamatsu et al. |
| 2011/0069110 A1 | 3/2011 | Matsumoto et al. |
| 2011/0069117 A1 | 3/2011 | Ohzeki et al. |
| 2011/0069129 A1 | 3/2011 | Shimizu |
| 2011/0085828 A1 | 4/2011 | Kosako et al. |
| 2011/0128300 A1 | 6/2011 | Gay et al. |
| 2011/0141188 A1 | 6/2011 | Morita |
| 2011/0149002 A1 | 6/2011 | Kessler |
| 2011/0150509 A1 | 6/2011 | Komiya |
| 2011/0150541 A1 | 6/2011 | Michibata |
| 2011/0169889 A1 | 7/2011 | Kojima et al. |
| 2011/0179961 A1 | 7/2011 | Yanagawa |
| 2011/0195260 A1 | 8/2011 | Lee et al. |
| 2011/0199414 A1 | 8/2011 | Lang |
| 2011/0234683 A1 | 9/2011 | Komatsu |
| 2011/0234689 A1 | 9/2011 | Saito |
| 2011/0242181 A1 | 10/2011 | Otobe |
| 2011/0249090 A1 | 10/2011 | Moore et al. |
| 2011/0269885 A1 | 11/2011 | Imai |
| 2011/0279554 A1 | 11/2011 | Dannhauser et al. |
| 2011/0298884 A1 | 12/2011 | Furuta |
| 2011/0304674 A1 | 12/2011 | Sambhy et al. |
| 2012/0013693 A1 | 1/2012 | Tasaka et al. |
| 2012/0013694 A1 | 1/2012 | Kanke |
| 2012/0013928 A1 | 1/2012 | Yoshida et al. |
| 2012/0026224 A1 | 2/2012 | Anthony et al. |
| 2012/0039647 A1 | 2/2012 | Brewington et al. |
| 2012/0094091 A1 | 4/2012 | Van et al. |
| 2012/0098882 A1 | 4/2012 | Onishi et al. |
| 2012/0105561 A1 | 5/2012 | Taniuchi et al. |
| 2012/0105562 A1 | 5/2012 | Sekiguchi et al. |
| 2012/0113180 A1 | 5/2012 | Tanaka et al. |
| 2012/0113203 A1 | 5/2012 | Kushida et al. |
| 2012/0127250 A1 | 5/2012 | Kanasugi et al. |
| 2012/0127251 A1 | 5/2012 | Tsuji et al. |
| 2012/0140009 A1 | 6/2012 | Kanasugi et al. |
| 2012/0154497 A1 | 6/2012 | Nakao et al. |
| 2012/0156375 A1 | 6/2012 | Brust et al. |
| 2012/0156624 A1 | 6/2012 | Rondon et al. |
| 2012/0162302 A1 | 6/2012 | Oguchi et al. |
| 2012/0163846 A1 | 6/2012 | Andoh et al. |
| 2012/0188565 A1 | 7/2012 | Schweid et al. |
| 2012/0194830 A1 | 8/2012 | Gaertner et al. |
| 2012/0236100 A1 | 9/2012 | Toya |
| 2012/0237260 A1 | 9/2012 | Sengoku et al. |
| 2012/0287260 A1 | 11/2012 | Lu et al. |
| 2012/0301186 A1 | 11/2012 | Yang et al. |
| 2012/0314013 A1 | 12/2012 | Takemoto et al. |
| 2012/0314077 A1 | 12/2012 | Clavenna, II et al. |
| 2013/0011158 A1 | 1/2013 | Meguro et al. |
| 2013/0017006 A1 | 1/2013 | Suda |
| 2013/0033554 A1 | 2/2013 | Bouverie et al. |
| 2013/0044188 A1 | 2/2013 | Nakamura et al. |
| 2013/0057603 A1 | 3/2013 | Gordon |
| 2013/0088543 A1 | 4/2013 | Tsuji et al. |
| 2013/0096871 A1 | 4/2013 | Takahama |
| 2013/0120513 A1 | 5/2013 | Thayer et al. |
| 2013/0182045 A1 | 7/2013 | Ohzeki et al. |
| 2013/0201237 A1 | 8/2013 | Thomson et al. |
| 2013/0234080 A1 | 9/2013 | Torikoshi et al. |
| 2013/0242016 A1 | 9/2013 | Edwards et al. |
| 2013/0278945 A1* | 10/2013 | Ono .................... G03G 15/235 358/1.2 |
| 2013/0302065 A1 | 11/2013 | Mori et al. |
| 2013/0338273 A1 | 12/2013 | Shimanaka et al. |
| 2014/0001013 A1 | 1/2014 | Takifuji et al. |
| 2014/0011125 A1 | 1/2014 | Inoue et al. |
| 2014/0043398 A1 | 2/2014 | Butler et al. |
| 2014/0104360 A1 | 4/2014 | Häcker et al. |
| 2014/0132698 A1 | 5/2014 | Lakin |
| 2014/0153956 A1 | 6/2014 | Yonemoto |
| 2014/0168330 A1 | 6/2014 | Liu et al. |
| 2014/0175707 A1 | 6/2014 | Wolk et al. |
| 2014/0198162 A1 | 7/2014 | Dirubio et al. |
| 2014/0225970 A1 | 8/2014 | Lakin et al. |
| 2014/0232782 A1 | 8/2014 | Mukai et al. |
| 2014/0267777 A1 | 9/2014 | Le et al. |
| 2014/0334855 A1 | 11/2014 | Onishi et al. |
| 2014/0339056 A1 | 11/2014 | Iwakoshi et al. |
| 2015/0022605 A1 | 1/2015 | Mantell et al. |
| 2015/0024648 A1 | 1/2015 | Landa et al. |
| 2015/0025179 A1 | 1/2015 | Landa et al. |
| 2015/0072090 A1 | 3/2015 | Landa et al. |
| 2015/0085036 A1 | 3/2015 | Liu et al. |
| 2015/0085037 A1 | 3/2015 | Liu et al. |
| 2015/0085038 A1 | 3/2015 | Liu |
| 2015/0116408 A1 | 4/2015 | Armbruster et al. |
| 2015/0116734 A1 | 4/2015 | Howard et al. |
| 2015/0118503 A1 | 4/2015 | Landa et al. |
| 2015/0165758 A1 | 6/2015 | Sambhy et al. |
| 2015/0195509 A1 | 7/2015 | Phipps |
| 2015/0210065 A1 | 7/2015 | Kelly et al. |
| 2015/0269719 A1 | 9/2015 | Kitai |
| 2015/0304531 A1 | 10/2015 | Rodriguez et al. |
| 2015/0315403 A1 | 11/2015 | Song et al. |
| 2015/0336378 A1 | 11/2015 | Guttmann et al. |
| 2015/0361288 A1 | 12/2015 | Song et al. |
| 2016/0031246 A1 | 2/2016 | Sreekumar et al. |
| 2016/0222232 A1 | 8/2016 | Landa et al. |
| 2016/0250879 A1 | 9/2016 | Chen et al. |
| 2016/0286462 A1 | 9/2016 | Gohite et al. |
| 2016/0375680 A1 | 12/2016 | Nishitani et al. |
| 2016/0378036 A1 | 12/2016 | Onishi et al. |
| 2017/0028688 A1 | 2/2017 | Dannhauser et al. |
| 2017/0104887 A1 | 4/2017 | Nomura |
| 2018/0149998 A1 | 5/2018 | Furukawa |
| 2018/0205853 A1 | 7/2018 | Terada |
| 2018/0259888 A1 | 9/2018 | Mitsui et al. |
| 2018/0348672 A1 | 12/2018 | Yoshida |
| 2018/0348675 A1 | 12/2018 | Nakamura et al. |
| 2019/0016114 A1 | 1/2019 | Sugiyama et al. |
| 2019/0094727 A1 | 3/2019 | Landa et al. |
| 2019/0105895 A1 | 4/2019 | Muehl et al. |
| 2019/0152218 A1 | 5/2019 | Stein et al. |
| 2019/0218411 A1 | 7/2019 | Landa et al. |
| 2019/0248153 A1 | 8/2019 | Muehl et al. |
| 2020/0156366 A1 | 5/2020 | Shmaiser et al. |
| 2020/0171813 A1 | 6/2020 | Chechik et al. |

(56) References Cited

U.S. PATENT DOCUMENTS

| | | |
|---|---|---|
| 2020/0210792 A1 | 7/2020 | Chen et al. |
| 2020/0238727 A1 | 7/2020 | Alacar |
| 2020/0276801 A1 | 9/2020 | Landa et al. |
| 2020/0314413 A1 | 10/2020 | Stiglic et al. |
| 2020/0326646 A1 | 10/2020 | Landa et al. |
| 2020/0353746 A1 | 11/2020 | Landa et al. |
| 2020/0361202 A1 | 11/2020 | Burkatovsky |
| 2020/0376878 A1 | 12/2020 | Landa et al. |
| 2020/0384758 A1 | 12/2020 | Shmaiser et al. |
| 2021/0001622 A1 | 1/2021 | Landa et al. |
| 2021/0053341 A1 | 2/2021 | Landa et al. |
| 2021/0062021 A1 | 3/2021 | Landa et al. |
| 2021/0070038 A1 | 3/2021 | Pomerantz et al. |
| 2021/0070083 A1 | 3/2021 | Levanon et al. |
| 2021/0084192 A1 | 3/2021 | Kasuya et al. |
| 2021/0095145 A1 | 4/2021 | Landa et al. |
| 2021/0268793 A1 | 9/2021 | Burkatovsky |
| 2022/0016880 A1 | 1/2022 | Landa et al. |
| 2022/0016881 A1 | 1/2022 | Shmaiser et al. |
| 2022/0057732 A1 | 2/2022 | Landa et al. |
| 2022/0111633 A1 | 4/2022 | Shmaiser et al. |
| 2022/0119659 A1 | 4/2022 | Landa et al. |
| 2022/0153015 A1 | 5/2022 | Landa et al. |
| 2022/0153048 A1 | 5/2022 | Landa et al. |
| 2022/0176693 A1 | 6/2022 | Landa et al. |
| 2022/0188050 A1 | 6/2022 | Boris |
| 2022/0379598 A1 | 12/2022 | Landa et al. |

FOREIGN PATENT DOCUMENTS

| | | |
|---|---|---|
| CN | 1212229 A | 3/1999 |
| CN | 1305895 A | 8/2001 |
| CN | 1324901 A | 12/2001 |
| CN | 1445622 A | 10/2003 |
| CN | 1493514 A | 5/2004 |
| CN | 1535235 A | 10/2004 |
| CN | 1543404 A | 11/2004 |
| CN | 1555422 A | 12/2004 |
| CN | 1680506 A | 10/2005 |
| CN | 1703326 A | 11/2005 |
| CN | 1720187 A | 1/2006 |
| CN | 1261831 C | 6/2006 |
| CN | 1809460 A | 7/2006 |
| CN | 1289368 C | 12/2006 |
| CN | 101073937 A | 11/2007 |
| CN | 101177057 A | 5/2008 |
| CN | 101249768 A | 8/2008 |
| CN | 101344746 A | 1/2009 |
| CN | 101359210 A | 2/2009 |
| CN | 101396910 A | 4/2009 |
| CN | 101508200 A | 8/2009 |
| CN | 101519007 A | 9/2009 |
| CN | 101524916 A | 9/2009 |
| CN | 101544100 A | 9/2009 |
| CN | 101544101 A | 9/2009 |
| CN | 101592896 A | 12/2009 |
| CN | 101607468 A | 12/2009 |
| CN | 201410787 Y | 2/2010 |
| CN | 101820241 A | 9/2010 |
| CN | 101835611 A | 9/2010 |
| CN | 101835612 A | 9/2010 |
| CN | 101873982 A | 10/2010 |
| CN | 102229294 A | 11/2011 |
| CN | 102248776 A | 11/2011 |
| CN | 102300932 A | 12/2011 |
| CN | 102529257 A | 7/2012 |
| CN | 102648095 A | 8/2012 |
| CN | 102673209 A | 9/2012 |
| CN | 102925002 A | 2/2013 |
| CN | 103045008 A | 4/2013 |
| CN | 103309213 A | 9/2013 |
| CN | 103568483 A | 2/2014 |
| CN | 103627337 A | 3/2014 |
| CN | 104015415 A | 9/2014 |
| CN | 104220934 A | 12/2014 |
| CN | 104271356 A | 1/2015 |
| CN | 104284850 A | 1/2015 |
| CN | 104618642 A | 5/2015 |
| CN | 105058999 A | 11/2015 |
| CN | 102555450 B | 3/2016 |
| CN | 103991293 B | 1/2017 |
| CN | 107111267 A | 8/2017 |
| DE | 102010049945 A1 | 5/2011 |
| DE | 102010060999 A1 | 6/2012 |
| EP | 0457551 A2 | 11/1991 |
| EP | 0499857 A1 | 8/1992 |
| EP | 0606490 A1 | 7/1994 |
| EP | 0609076 A2 | 8/1994 |
| EP | 0613791 A2 | 9/1994 |
| EP | 0676300 A2 | 10/1995 |
| EP | 0530627 B1 | 3/1997 |
| EP | 0784244 A2 | 7/1997 |
| EP | 0835762 A1 | 4/1998 |
| EP | 0843236 A2 | 5/1998 |
| EP | 0854398 A2 | 7/1998 |
| EP | 1013466 A2 | 6/2000 |
| EP | 1146090 A2 | 10/2001 |
| EP | 1158029 A1 | 11/2001 |
| EP | 0825029 B1 | 5/2002 |
| EP | 1247821 A2 | 10/2002 |
| EP | 1271263 A1 | 1/2003 |
| EP | 0867483 B1 | 6/2003 |
| EP | 0923007 B1 | 3/2004 |
| EP | 1454968 A1 | 9/2004 |
| EP | 1503326 A1 | 2/2005 |
| EP | 1777243 A1 | 4/2007 |
| EP | 2028238 A1 | 2/2009 |
| EP | 2042317 A1 | 4/2009 |
| EP | 2065194 A2 | 6/2009 |
| EP | 2228210 A1 | 9/2010 |
| EP | 2270070 A1 | 1/2011 |
| EP | 2042318 B1 | 2/2011 |
| EP | 2042325 B1 | 2/2012 |
| EP | 2634010 A1 | 9/2013 |
| EP | 2683556 A1 | 1/2014 |
| EP | 2075635 B1 | 10/2014 |
| EP | 3260486 A1 | 12/2017 |
| EP | 2823363 B1 | 10/2018 |
| GB | 748821 A | 5/1956 |
| GB | 1496016 A | 12/1977 |
| GB | 1520932 A | 8/1978 |
| GB | 1522175 A | 8/1978 |
| GB | 2321430 A | 7/1998 |
| JP | 48043941 | 12/1973 |
| JP | S5578904 A | 6/1980 |
| JP | S57121446 U | 7/1982 |
| JP | S6076343 A | 4/1985 |
| JP | S60199692 A | 10/1985 |
| JP | S6223783 A | 1/1987 |
| JP | H03248170 A | 11/1991 |
| JP | H05147208 A | 6/1993 |
| JP | H05192871 A | 8/1993 |
| JP | H05297737 A | 11/1993 |
| JP | H06954 A | 1/1994 |
| JP | H06100807 A | 4/1994 |
| JP | H06171076 A | 6/1994 |
| JP | H06345284 A | 12/1994 |
| JP | H07112841 A | 5/1995 |
| JP | H07186453 A | 7/1995 |
| JP | H07238243 A | 9/1995 |
| JP | H0862999 A | 3/1996 |
| JP | H08112970 A | 5/1996 |
| JP | 2529651 B2 | 8/1996 |
| JP | H09123432 A | 5/1997 |
| JP | H09157559 A | 6/1997 |
| JP | H09172551 A | 6/1997 |
| JP | H09281851 A | 10/1997 |
| JP | H09300678 A | 11/1997 |
| JP | H09314867 A | 12/1997 |
| JP | H10130597 A | 5/1998 |
| JP | H10207645 A | 8/1998 |
| JP | H1142811 A | 2/1999 |
| JP | H11503244 A | 3/1999 |
| JP | H11106081 A | 4/1999 |

(56) References Cited

FOREIGN PATENT DOCUMENTS

| | | | |
|---|---|---|---|
| JP | H11138740 A | 5/1999 | |
| JP | H11245383 A | 9/1999 | |
| JP | 2000108320 A | 4/2000 | |
| JP | 2000108334 A | 4/2000 | |
| JP | 2000137595 A | 5/2000 | |
| JP | 2000141710 A | 5/2000 | |
| JP | 2000168062 A | 6/2000 | |
| JP | 2000169772 A | 6/2000 | |
| JP | 2000206801 A | 7/2000 | |
| JP | 2000343025 A | 12/2000 | |
| JP | 2001005245 A * | 1/2001 | |
| JP | 2001088430 A | 4/2001 | |
| JP | 2001098201 A | 4/2001 | |
| JP | 2001139865 A | 5/2001 | |
| JP | 3177985 B2 | 6/2001 | |
| JP | 2001164165 A | 6/2001 | |
| JP | 2001199150 A | 7/2001 | |
| JP | 2001206522 A | 7/2001 | |
| JP | 2002020666 A | 1/2002 | |
| JP | 2002049211 A | 2/2002 | |
| JP | 2002504446 A | 2/2002 | |
| JP | 2002069346 A | 3/2002 | |
| JP | 2002103598 A | 4/2002 | |
| JP | 2002169383 A | 6/2002 | |
| JP | 2002229276 A | 8/2002 | |
| JP | 2002234243 A | 8/2002 | |
| JP | 2002278365 A | 9/2002 | |
| JP | 2002292983 A | 10/2002 | |
| JP | 2002304066 A | 10/2002 | |
| JP | 2002326733 A | 11/2002 | |
| JP | 2002371208 A | 12/2002 | |
| JP | 2003057967 A | 2/2003 | |
| JP | 2003076159 A | 3/2003 | |
| JP | 2003094795 A | 4/2003 | |
| JP | 2003114558 A | 4/2003 | |
| JP | 2003145914 A | 5/2003 | |
| JP | 2003183557 A | 7/2003 | |
| JP | 2003211770 A | 7/2003 | |
| JP | 2003219271 A | 7/2003 | |
| JP | 2003246135 A | 9/2003 | |
| JP | 2003246484 A | 9/2003 | |
| JP | 2003292855 A | 10/2003 | |
| JP | 2003295560 A | 10/2003 | |
| JP | 2003313466 A | 11/2003 | |
| JP | 2004009632 A | 1/2004 | |
| JP | 2004011263 A | 1/2004 | |
| JP | 2004019022 A | 1/2004 | |
| JP | 2004025708 A | 1/2004 | |
| JP | 2004034441 A | 2/2004 | |
| JP | 2004077669 A | 3/2004 | |
| JP | 2004114377 A | 4/2004 | |
| JP | 2004114675 A | 4/2004 | |
| JP | 2004148687 A | 5/2004 | |
| JP | 2004167902 A | 6/2004 | |
| JP | 2004231711 A | 8/2004 | |
| JP | 2004524190 A | 8/2004 | |
| JP | 2004261975 A | 9/2004 | |
| JP | 2004318132 A | 11/2004 | |
| JP | 2004325782 A | 11/2004 | |
| JP | 2004340983 A | 12/2004 | |
| JP | 2005014255 A | 1/2005 | |
| JP | 2005014256 A | 1/2005 | |
| JP | 2005114769 A | 4/2005 | |
| JP | 2005215247 A | 8/2005 | |
| JP | 2005307184 A | 11/2005 | |
| JP | 2005319593 A | 11/2005 | |
| JP | 2006001688 A | 1/2006 | |
| JP | 2006023403 A | 1/2006 | |
| JP | 2006095870 A | 4/2006 | |
| JP | 2006102975 A | 4/2006 | |
| JP | 2006137127 A | 6/2006 | |
| JP | 2006143778 A | 6/2006 | |
| JP | 2006152133 A | 6/2006 | |
| JP | 2006224583 A | 8/2006 | |
| JP | 2006231666 A | 9/2006 | |
| JP | 2006234212 A | 9/2006 | |
| JP | 2006243212 A | 9/2006 | |
| JP | 2006263984 A | 10/2006 | |
| JP | 2006347081 A | 12/2006 | |
| JP | 2006347085 A | 12/2006 | |
| JP | 2007025246 A | 2/2007 | |
| JP | 2007041530 A | 2/2007 | |
| JP | 2007069584 A | 3/2007 | |
| JP | 2007079159 A | 3/2007 | |
| JP | 2007083445 A | 4/2007 | |
| JP | 2007174060 A | 7/2007 | |
| JP | 2007190745 A | 8/2007 | |
| JP | 2007216673 A | 8/2007 | |
| JP | 2007253347 A | 10/2007 | |
| JP | 2007334125 A | 12/2007 | |
| JP | 2008006816 A | 1/2008 | |
| JP | 2008018716 A | 1/2008 | |
| JP | 2008019286 A | 1/2008 | |
| JP | 2008036968 A | 2/2008 | |
| JP | 2008082820 A | 4/2008 | |
| JP | 2008137146 A | 6/2008 | |
| JP | 2008137239 A | 6/2008 | |
| JP | 2008139877 A | 6/2008 | |
| JP | 2008142962 A | 6/2008 | |
| JP | 2008183744 A | 8/2008 | |
| JP | 2008194997 A | 8/2008 | |
| JP | 2008532794 A | 8/2008 | |
| JP | 2008201564 A | 9/2008 | |
| JP | 2008238674 A | 10/2008 | |
| JP | 2008246787 A | 10/2008 | |
| JP | 2008246990 A | 10/2008 | |
| JP | 2008254203 A | 10/2008 | |
| JP | 2008255135 A | 10/2008 | |
| JP | 2009040892 A | 2/2009 | |
| JP | 2009045794 A | 3/2009 | |
| JP | 2009045851 A | 3/2009 | |
| JP | 2009045885 A | 3/2009 | |
| JP | 2009083314 A | 4/2009 | |
| JP | 2009083317 A | 4/2009 | |
| JP | 2009083325 A | 4/2009 | |
| JP | 2009096175 A | 5/2009 | |
| JP | 2009148908 A | 7/2009 | |
| JP | 2009154330 A | 7/2009 | |
| JP | 2009190375 A | 8/2009 | |
| JP | 2009202355 A | 9/2009 | |
| JP | 2009214318 A | 9/2009 | |
| JP | 2009214439 A | 9/2009 | |
| JP | 2009532240 A | 9/2009 | |
| JP | 2009226805 A | 10/2009 | |
| JP | 2009226852 A | 10/2009 | |
| JP | 2009226886 A | 10/2009 | |
| JP | 2009226890 A | 10/2009 | |
| JP | 2009227909 A | 10/2009 | |
| JP | 2009233977 A | 10/2009 | |
| JP | 2009234219 A | 10/2009 | |
| JP | 2009240925 A | 10/2009 | |
| JP | 2009271422 A | 11/2009 | |
| JP | 2010005815 A | 1/2010 | |
| JP | 2010030300 A | 2/2010 | |
| JP | 2010054855 A | 3/2010 | |
| JP | 2010510357 A | 4/2010 | |
| JP | 2010105365 A | 5/2010 | |
| JP | 2010173201 A | 8/2010 | |
| JP | 2010184376 A | 8/2010 | |
| JP | 2010214885 A | 9/2010 | |
| JP | 4562388 B2 | 10/2010 | |
| JP | 2010228192 A | 10/2010 | |
| JP | 2010228392 A | 10/2010 | |
| JP | 2010231040 A * | 10/2010 | ......... G03G 15/0194 |
| JP | 2010234599 A | 10/2010 | |
| JP | 2010234681 A | 10/2010 | |
| JP | 2010240897 A | 10/2010 | |
| JP | 2010241073 A | 10/2010 | |
| JP | 2010247381 A | 11/2010 | |
| JP | 2010247528 A | 11/2010 | |
| JP | 2010258193 A | 11/2010 | |
| JP | 2010260204 A | 11/2010 | |
| JP | 2010260287 A | 11/2010 | |
| JP | 2010260302 A | 11/2010 | |

(56) References Cited

FOREIGN PATENT DOCUMENTS

| | | |
|---|---|---|
| JP | 2010286570 A | 12/2010 |
| JP | 2011002532 A | 1/2011 |
| JP | 2011025431 A | 2/2011 |
| JP | 2011031619 A | 2/2011 |
| JP | 2011037070 A | 2/2011 |
| JP | 2011064850 A | 3/2011 |
| JP | 2011067956 A | 4/2011 |
| JP | 2011126031 A | 6/2011 |
| JP | 2011133884 A | 7/2011 |
| JP | 2011144271 A | 7/2011 |
| JP | 2011523601 A | 8/2011 |
| JP | 2011168024 A | 9/2011 |
| JP | 2011173325 A | 9/2011 |
| JP | 2011173326 A | 9/2011 |
| JP | 2011186346 A | 9/2011 |
| JP | 2011189627 A | 9/2011 |
| JP | 2011201951 A | 10/2011 |
| JP | 2011224032 A | 11/2011 |
| JP | 2012042943 A | 3/2012 |
| JP | 2012086437 A | 5/2012 |
| JP | 2012086499 A | 5/2012 |
| JP | 2012111194 A | 6/2012 |
| JP | 2012126123 A | 7/2012 |
| JP | 2012139905 A | 7/2012 |
| JP | 2012196787 A | 10/2012 |
| JP | 2012201419 A | 10/2012 |
| JP | 2013001081 A | 1/2013 |
| JP | 2013060299 A | 4/2013 |
| JP | 2013103474 A | 5/2013 |
| JP | 2013104044 A | 5/2013 |
| JP | 2013121671 A | 6/2013 |
| JP | 2013129158 A | 7/2013 |
| JP | 2014008609 A | 1/2014 |
| JP | 2014047005 A | 3/2014 |
| JP | 2014073675 A | 4/2014 |
| JP | 2014094827 A | 5/2014 |
| JP | 2014131843 A | 7/2014 |
| JP | 2015517928 A | 6/2015 |
| JP | 2015202616 A | 11/2015 |
| JP | 2016074206 A | 5/2016 |
| JP | 2016093999 A | 5/2016 |
| JP | 2016185688 A | 10/2016 |
| JP | 2016539830 A | 12/2016 |
| JP | 2017093178 A | 5/2017 |
| JP | 2017219753 A | 12/2017 |
| RU | 2180675 C2 | 3/2002 |
| RU | 2282643 C1 | 8/2006 |
| WO | WO-8600327 A1 | 1/1986 |
| WO | WO-9307000 A1 | 4/1993 |
| WO | WO-9401283 A1 | 1/1994 |
| WO | WO-9604339 A1 | 2/1996 |
| WO | WO-9631809 A1 | 10/1996 |
| WO | WO-9707991 A1 | 3/1997 |
| WO | WO-9736210 A1 | 10/1997 |
| WO | WO-9821251 A1 | 5/1998 |
| WO | WO-9855901 A1 | 12/1998 |
| WO | WO-9912633 A1 | 3/1999 |
| WO | WO-9942509 A1 | 8/1999 |
| WO | WO-9943502 A2 | 9/1999 |
| WO | WO-0064685 A1 | 11/2000 |
| WO | WO-0154902 A1 | 8/2001 |
| WO | WO-0170512 A1 | 9/2001 |
| WO | WO-02068191 A1 | 9/2002 |
| WO | WO-02078868 A2 | 10/2002 |
| WO | WO-02094912 A1 | 11/2002 |
| WO | WO-2004113082 A1 | 12/2004 |
| WO | WO-2004113450 A1 | 12/2004 |
| WO | WO-2006051733 A1 | 5/2006 |
| WO | WO-2006069205 A1 | 6/2006 |
| WO | WO-2006073696 A1 | 7/2006 |
| WO | WO-2006091957 A2 | 8/2006 |
| WO | WO-2007009871 A2 | 1/2007 |
| WO | WO-2007145378 A1 | 12/2007 |
| WO | WO-2008078841 A1 | 7/2008 |
| WO | WO-2009025809 A1 | 2/2009 |
| WO | WO-2009134273 A1 | 11/2009 |
| WO | WO-2010042784 A3 | 7/2010 |
| WO | WO-2010073916 A1 | 7/2010 |
| WO | WO-2011142404 A1 | 11/2011 |
| WO | WO-2012014825 A1 | 2/2012 |
| WO | WO-2012148421 A1 | 11/2012 |
| WO | WO-2013060377 A1 | 5/2013 |
| WO | WO-2013087249 A1 | 6/2013 |
| WO | WO-2013132339 A1 | 9/2013 |
| WO | WO-2013132340 A1 | 9/2013 |
| WO | WO-2013132343 A1 | 9/2013 |
| WO | WO-2013132345 A1 | 9/2013 |
| WO | WO-2013132356 A1 | 9/2013 |
| WO | WO-2013132418 A2 | 9/2013 |
| WO | WO-2013132419 A1 | 9/2013 |
| WO | WO-2013132420 A1 | 9/2013 |
| WO | WO-2013132424 A1 | 9/2013 |
| WO | WO-2013132432 A1 | 9/2013 |
| WO | WO-2013132438 A2 | 9/2013 |
| WO | WO-2013132439 A1 | 9/2013 |
| WO | WO-2013136220 A1 | 9/2013 |
| WO | 2015026864 A1 | 2/2015 |
| WO | WO-2015036864 A1 | 3/2015 |
| WO | WO-2015036906 A1 | 3/2015 |
| WO | WO-2015036960 A1 | 3/2015 |
| WO | WO-2016166690 A1 | 10/2016 |
| WO | WO-2017208155 A1 | 12/2017 |
| WO | WO-2017208246 A1 | 12/2017 |
| WO | WO-2018100541 A1 | 6/2018 |
| WO | 2020136517 A1 | 7/2020 |

OTHER PUBLICATIONS

English translation of JP-2010231040-A (Patents Application 2009-079294). (Year: 2010).*
CN101592896A Machine Translation (by EPO and Google)—published Dec. 2, 2009; Canon KK.
CN101820241A Machine Translation (by EPO and Google)—published Sep. 1, 2010; Canon KK.
CN102529257A Machine Translation (by EPO and Google)—published Jul. 4, 2012; Nippon Synthetic Chem Ind.
CN102673209A Machine Translation (by EPO and Google)—published Sep. 19, 2012; Wistron Corp.
CN103568483A Machine Translation (by EPO and Google)—published Feb. 12, 2014; Anhui Printing Mechanical & Electrical Co Ltd.
CN104015415A Machine Translation (by EPO and Google)—published Sep. 3, 2014; Avery Dennison Corp.
CN1305895A Machine Translation (by EPO and Google)—published Aug. 1, 2001; IMAJE SA [FR].
CN1543404A Machine Translation (by EPO and Google)—published Nov. 3, 2004; 3M Innovative Properties Co [US].
CN1703326A Machine Translation (by EPO and Google)—published Nov. 30, 2005; Nissha Printing [JP].
Co-pending U.S. Appl. No. 17/438,497, inventors Helena; Chechik et al., filed Sep. 13, 2021.
Co-pending U.S. Appl. No. 17/583,372, inventor Pomerantz; Uriel, filed Jan. 25, 2022.
Co-pending U.S. Appl. No. 17/676,398, filed Mar. 21, 2022.
Co-pending U.S. Appl. No. 17/694,702, inventor Chechik; Helena, filed Mar. 15, 2022.
Co-pending U.S. Appl. No. 17/712,198, filed Apr. 4, 2022.
JP2000343025A Machine Translation (by EPO and Google)—published Dec. 12, 2000; Kyocera Corp.
JP2003076159A Machine Translation (by EPO and Google)—published Mar. 14, 2003; Ricoh KK.
JP2003094795A Machine Translation (by EPO and Google)—published Apr. 3, 2003; Ricoh KK.
JP2004167902A Machine Translation (by EPO and Google)—published Jun. 17, 2004; Nippon New Chrome KK.
JP2004340983A Machine Translation (by EPO and Google)—published Dec. 2, 2004; Ricoh KK.
JP2008082820A Machine Translation (by EPO and Google)—published Apr. 10, 2008; Ricoh KK.

(56) References Cited

OTHER PUBLICATIONS

JP2008137146A Machine Translation (by EPO and Google)—published Jun. 19, 2008; CBG ACCIAI SRL.
JP2009226805A Machine Translation (by EPO and Google)—published Oct. 8, 2009; Fuji Xerox Co Ltd.
JP2009226890A Machine Translation (by EPO and Google)—published Oct. 8, 2009; Fuji Xerox Co Ltd.
JP2009227909A Machine Translation (EPO, PlatPat and Google) published on Oct. 8, 2009 Fujifilm Corp.
JP2009240925A Machine Translation (by EPO and Google)—published Oct. 22, 2009; Fujifilm Corp.
JP2009271422A Machine Translation (by EPO and Google)—published Nov. 19, 2009; Ricoh KK.
JP2009532240A Machine Translation (by EPO and Google)—published Sep. 10, 2009; Aisapack Holding SA.
JP2010030300A Machine Translation (by EPO and Google)—published Feb. 12, 2010; Xerox Corp.
JP2010240897A Machine Translation (by EPO and Google)—published Oct. 28, 2010; Toppan Printing Co Ltd.
JP2011031619A Machine Translation (by EPO and Google)—published Feb. 17, 2011; Xerox Corp.
JP2011064850A Machine Translation (by EPO and Google)—published Mar. 31, 2011; Seiko Epson Corp.
JP2011168024A Machine Translation (EPO, PlatPat and Google) published on Sep. 1, 2011 Ricoh Co Ltd.
JP2013104044A Machine Translation (by EPO and Google)—published May 30, 2013; Three M Innovative Properties.
JP2014008609A Machine Translation (EPO, PlatPat and Google) published on Jan. 20, 2014 Seiko Epson Corp.
JP2014073675A Machine Translation (EPO and Google) published on Apr. 24, 2014 Ricoh Co Ltd.
JP2015202616A Machine Translation (EPO, PlatPat and Google) published on Nov. 16, 2015 Canon KK.
JP2016074206A Machine Translation (EPO and Google) published on May 12, 2016 Xerox Corp.
JP2016093999A Machine Translation (by EPO and Google)—published May 26, 2016; Canon KK.
JP2017093178A Machine Translation (EPO and Google) published on May 25, 2017 Samsung Electronics Co Ltd.
JP4562388B2 Machine Translation (by EPO and Google)—published Oct. 13, 2010; Sk Kaken Co Ltd.
JP48043941 Machine Translation (by EPO and Google)—published Dec. 21, 1973.
JPH09300678A Machine Translation (by EPO and Google)—published Nov. 25, 1997; Mitsubishi Electric Corp.
JPH10130597A Machine Translation (by EPO and Google)—published May 19, 1998; Sekisui Chemical Co Ltd.
JPH11138740A Machine Translation (by EPO and Google)—published May 25, 1999; Nikka KK.
Xiameter™ "OFS-0777 Siliconate Technical Data Sheet," Dec. 31, 2017, 5 pages. [Retrieved from the internet on Oct. 13, 2021]: https://www.dow.com/en-us/document-viewer.html?ramdomVar=6236427586842315077&docPath=/content/dam/dcc/documents/en-us/productdatasheet/95/95-4/95-435-01-xiameter-ofs-0777-siliconate.pdf.
DE102010049945A1 Machine Translation (by EPO and Google)—published May 26, 2011; Heidelberger Druckmasch AG [DE].
JP2000137595A Machine Translation (by EPO and Google)—published May 16, 2000; Dainippon Screen Mfg.
JP2002292983A Machine Translation (by EPO and Google)—published Oct. 9, 2002; Fuji Xerox Co Ltd.
JP2003295560A Machine Translation (by EPO and Google)—published Oct. 15, 2003; Fuji Xerox Co Ltd.
JP2007174060A Machine Translation (by EPO and Google)—published Jul. 5, 2007; Fuji Xerox Co Ltd.
JP2012086437A Machine Translation (by EPO and Google)—published May 10, 2012; Sharp KK.
JP2017219753A Machine Translation (by EPO and Google)—published Dec. 14, 2017; Ricoh Co Ltd.
JPH09172551A Machine Translation (by EPO and Google)—published Jun. 30, 1997; Fuji Photo Film Co Ltd.
JPH10207645A Machine Translation (by EPO and Google)—published Aug. 7, 1998; Canon KK.
Mestha L.K. et al., "Control Elements in Production Printing and Publishing Systems: Docucolor Igen3," 42nd IEEE International Conference on Decision and Control (IEEE Cat. No.03CH37475), Dec. 2003, vol. 4, pp. 4096-4108. doi: 10.11 09/CDC.2003.1271793.
"Amino Functional Silicone Polymers", in Xiameter.COPYRGT. 2009 Dow Corning Corporation.
BASF , "JONCRYL 537", Datasheet , Retrieved from the internet : Mar. 23, 2007 p. 1.
Clariant., "Ultrafine Pigment Dispersion for Design and Creative Materials: Hostafine Pigment Preparation" Jun. 19, 2008. Retrieved from the Internet: [URL: http://www.clariant.com/C125720D002B963C/4352D0BC052E90CEC1257479002707D9/$FILE /DP6208E_0608_FL_Hostafinefordesignandcreativematerials.pdf].
CN101073937A Machine Translation (by EPO and Google)—published Nov. 21, 2007; Werner Kaman Maschinen Gmbh & [DE].
CN101177057 Machine Translation (by EPO and Google)—published May 14, 2008—Hangzhou Yuanyang Industry Co.
CN101249768A Machine Translation (by EPO and Google)—published Aug. 27, 2008; Shantou Xinxie Special Paper T [CN].
CN101344746A Machine Translation (by EPO and Google)—published Jan. 14, 2009; Ricoh KK [JP].
CN101359210A Machine Translation (by EPO and Google)—published Feb. 4, 2009; Canon KK [JP].
CN101524916A Machine Translation (by EPO and Google)—published Sep. 9, 2009; Fuji Xerox Co Ltd.
CN101544100A Machine Translation (by EPO and Google)—published Sep. 30, 2009; Fuji Xerox Co Ltd.
CN101873982A Machine Translation (by EPO and Google)—published Oct. 27, 2010; Habasit AG, Delair et al.
CN102229294A Machine Translation (by EPO and Google)—published Nov. 2, 2011; Guangzhou Changcheng Ceramics Co Ltd.
CN102300932A Machine Translation (by EPO and Google)—published Dec. 28, 2011; Yoshida Hiroaki et al.
CN102648095A Machine Translation (by EPO and Google)—published Aug. 22, 2012; Mars Inc.
CN102925002 Machine Translation (by EPO and Google)—published Feb. 13, 2013; Jiangnan University, Fu et al.
CN103045008A Machine Translation (by EPO and Google)—published Apr. 17, 2013; Fuji Xerox Co Ltd.
CN103627337A Machine Translation (by EPO and Google)—published Mar. 12, 2014; Suzhou Banlid New Material Co Ltd.
CN103991293A Machine Translation (by EPO and Google)—published Aug. 20, 2014; Miyakoshi Printing Machinery Co., Ltd, Junichi et al.
CN103991293B Machine Translation (by EPO and Google)—issued on Jan. 4, 2017; Miyakoshi Printing Machinery Co., Ltd, Junichi et al.
CN104618642 Machine Translation (by EPO and Google); published on May 13, 2015, Yulong Comp Comm Tech Shenzhen.
CN105058999A Machine Translation (by EPO and Google)—published Nov. 18, 2015; Zhuoli Imaging Technology Co Ltd.
CN107111267A Machine Translation (by EPO and Google)—published Aug. 29, 2017; Hewlett Packard Indigo BV.
CN1121033A Machine Translation (by EPO and Google—published Apr. 24, 1996; Kuehnle Manfred R [US].
CN1212229A Machine Translation (by EPO and Google)—published Mar. 31, 1999; Honta Industry Corp [JP].
CN1493514A Machine Translation (by EPO and Google)—published May 5, 2004; GD SPA, Boderi et al.
CN1555422A Machine Translation (by EPO and Google)—published Dec. 15, 2004; Noranda Inc.
CN1680506A Machine Translation (by EPO and Google)—published Oct. 12, 2005; Shinetsu Chemical Co [JP].
CN1809460A Machine Translation (by EPO and Google)—published Jul. 26, 2006; Canon KK.
CN201410787Y Machine Translation (by EPO and Google)—published Feb. 24, 2010; Zhejiang Chanx Wood Co Ltd.
Co-pending U.S. Appl. No. 16/590,397, filed Oct. 2, 2019.

(56) References Cited

OTHER PUBLICATIONS

Co-pending U.S. Appl. No. 17/088,257, filed Nov. 3, 2020.
Co-pending U.S. Appl. No. 17/106,245, filed Nov. 30, 2020.
Co-pending U.S. Appl. No. 17/155,121, filed Jan. 22, 2021.
Co-pending U.S. Appl. No. 17/157,767, filed Jan. 25, 2021.
Co-pending U.S. Appl. No. 17/184,411, filed Feb. 24, 2021.
Co-pending U.S. Appl. No. 17/186,043, filed Feb. 26, 2021.
Co-pending U.S. Appl. No. 17/252,747, filed Dec. 16, 2020.
DE102010060999 Machine Translation (by EPO and Google)—published Jun. 6, 2012; Wolf, Roland, Dr.-Ing.
Epomin Polyment, product information from Nippon Shokubai, dated Feb. 28, 2014.
Flexicon., "Bulk Handling Equipment and Systems: Carbon Black," 2018, 2 pages.
Furia, T.E., "CRC Handbook of Food Additives, Second Edition, vol. 1" CRC Press LLC, 1972, p. 434.
Handbook of Print Media, 2001, Springer Verlag, Berlin/Heidelberg/New York, pp. 127-136,748—With English Translation.
IP.com Search, 2018, 2 pages.
IP.com Search, 2019, 1 page.
IP.com search (Year: 2021).
JP2000108320 Machine Translation (by PlatPat English machine translation)—published Apr. 18, 2000 Brother Ind. Ltd.
JP2000108334A Machine Translation (by EPO and Google)—published Apr. 18, 2000; Brother Ind Ltd.
JP2000141710A Machine Translation (by EPO and Google)—published May 23, 2000; Brother Ind Ltd.
JP2000168062A Machine Translation (by EPO and Google)—published Jun. 20, 2000; Brother Ind Ltd.
JP2000169772 Machine Translation (by EPO and Google)—published Jun. 20, 2000; Tokyo Ink MFG Co Ltd.
JP2000206801 Machine Translation (by PlatPat English machine translation); published on Jul. 28, 2000, Canon KK, Kobayashi et al.
JP2001088430A Machine Translation (by EPO and Google)—published Apr. 3, 2001; Kimoto KK.
JP2001098201A Machine Translation (by EPO and Google)—published Apr. 10, 2001; Eastman Kodak Co.
JP2001139865A Machine Translation (by EPO and Google)—published May 22, 2001; Sharp KK.
JP2001164165A Machine Translation (by EPO and Google)—published Jun. 19, 2001; Dainippon Ink & Chemicals.
JP2001199150A Machine Translation (by EPO and Google)—published Jul. 24, 2001; Canon KK.
JP2001206522 Machine Translation (by EPO, PlatPat and Google)—published Jul. 31, 2001; Nitto Denko Corp, Kato et al.
JP2002049211A Machine Translation (by EPO and Google)—published Feb. 15, 2002; Pfu Ltd.
JP2002069346A Machine Translation (by EPO and Google)—published Mar. 8, 2002; Dainippon Ink & Chemicals.
JP2002103598A Machine Translation (by EPO and Google)—published Apr. 9, 2002; Olympus Optical Co.
JP2002169383 Machine Translation (by EPO, PlatPat and Google)—published Jun. 14, 2002 Ricoh KK.
JP2002234243 Machine Translation (by EPO and Google)—published Aug. 20, 2002; Hitachi Koki Co Ltd.
JP2002278365 Machine Translation (by PlatPat English machine translation)—published Sep. 27, 2002 Katsuaki, Ricoh KK.
JP2002304066A Machine Translation (by EPO and Google)—published Oct. 18, 2002; Pfu Ltd.
JP2002326733 Machine Translation (by EPO, PlatPat and Google)—published Nov. 12, 2002; Kyocera Mita Corp.
JP2002371208 Machine Translation (by EPO and Google)—published Dec. 26, 2002; Canon Inc.
JP2003114558 Machine Translation (by EPO, PlatPat and Google)—published Apr. 18, 2003 Mitsubishi Chem Corp, Yuka Denshi Co Ltd, et al.
JP2003145914A Machine Translation (by EPO and Google)—published May 21, 2003; Konishiroku Photo Ind.
JP2003211770 Machine Translation (by EPO and Google)—published Jul. 29, 2003 Hitachi Printing Solutions.
JP2003219271 Machine Translation (by EPO and Google); published on Jul. 31, 2003, Japan Broadcasting.
JP2003246135 Machine Translation (by PlatPat English machine translation)—published Sep. 2, 2003 Ricoh KK, Morohoshi et al.
JP2003246484 Machine Translation (English machine translation)—published Sep. 2, 2003 Kyocera Corp.
JP2003292855A Machine Translation (by EPO and Google)—published Oct. 15, 2003; Konishiroku Photo Ind.
JP2003313466A Machine Translation (by EPO and Google)—published Nov. 6, 2003; Ricoh KK.
JP2004009632A Machine Translation (by EPO and Google)—published Jan. 15, 2004; Konica Minolta Holdings Inc.
JP2004011263A Machine Translation (by EPO and Google)—published Jan. 15, 2004; Sumitomo Denko Steel Wire KK.
JP2004019022 Machine Translation (by EPO and Google)—published Jan. 22, 2004; Yamano et al.
JP2004025708A Machine Translation (by EPO and Google)—published Jan. 29, 2004; Konica Minolta Holdings Inc.
JP2004034441A Machine Translation (by EPO and Google)—published Feb. 5, 2004; Konica Minolta Holdings Inc.
JP2004077669 Machine Translation (by PlatPat English machine translation)—published Mar. 11, 2004 Fuji Xerox Co Ltd.
JP2004114377(A) Machine Translation (by EPO and Google)—published Apr. 15, 2004; Konica Minolta Holdings Inc, et al.
JP2004114675 Machine Translation (by EPO and Google)—published Apr. 15, 2004; Canon Inc.
JP2004148687A Machine Translation (by EPO and Google)—published May 27, 2014; Mitsubishi Heavy Ind Ltd.
JP2004231711 Machine Translation (by EPO and Google)—published Aug. 19, 2004; Seiko Epson Corp.
JP2004261975 Machine Translation (by EPO, PlatPat and Google); published on Sep. 24, 2004, Seiko Epson Corp, Kataoka et al.
JP2004325782A Machine Translation (by EPO and Google)—published Nov. 18, 2004; Canon KK.
JP2004524190A Machine Translation (by EPO and Google)—published Aug. 12, 2004; Avery Dennison Corp.
JP2005014255 Machine Translation (by EPO and Google)—published Jan. 20, 2005; Canon Inc.
JP2005014256 Machine Translation (by EPO and Google)—published Jan. 20, 2005; Canon Inc.
JP2005114769 Machine Translation (by PlatPat English machine translation)—published Apr. 28, 2005 Ricoh KK.
JP2005215247A Machine Translation (by EPO and Google)—published Aug. 11, 2005; Toshiba Corp.
JP2005319593 Machine Translation (by EPO and Google)—published Nov. 17, 2005, Jujo Paper Co Ltd.
JP2006001688 Machine Translation (by PlatPat English machine translation)—published Jan. 5, 2006 Ricoh KK.
JP2006023403A Machine Translation (by EPO and Google)—published Jan. 26, 2006; Ricoh KK.
JP2006095870A Machine Translation (by EPO and Google)—published Apr. 13, 2006; Fuji Photo Film Co Ltd.
JP2006102975 Machine Translation (by EPO and Google)—published Apr. 20, 2006; Fuji Photo Film Co Ltd.
JP2006137127 Machine Translation (by EPO and Google)—published Jun. 1, 2006; Konica Minolta Med & Graphic.
JP2006143778 Machine Translation (by EPO, PlatPat and Google)—published Jun. 8, 2006 Sun Bijutsu Insatsu KK et al.
JP2006152133 Machine Translation (by EPO, PlatPat and Google)—published Jun. 15, 2006 Seiko Epson Corp.
JP2006224583A Machine Translation (by EPO and Google)—published Aug. 31, 2006; Konica Minolta Holdings Inc.
JP2006231666A Machine Translation (by EPO and Google)—published Sep. 7, 2006; Seiko Epson Corp.
JP2006234212A Machine Translation (by EPO and Google)—published Sep. 7, 2006; Matsushita Electric Ind Co Ltd.
JP2006243212 Machine Translation (by PlatPat English machine translation)—published Sep. 14, 2006 Fuji Xerox Co Ltd.
JP2006263984 Machine Translation (by EPO, PlatPat and Google)—published Oct. 5, 2006 Fuji Photo Film Co Ltd.
JP2006347081 Machine Translation (by EPO and Google)—published Dec. 28, 2006; Fuji Xerox Co Ltd.

(56) References Cited

OTHER PUBLICATIONS

JP2006347085 Machine Translation (by EPO and Google)—published Dec. 28, 2006 Fuji Xerox Co Ltd.
JP2007025246A Machine Translation (by EPO and Google)—published Feb. 1, 2007; Seiko Epson Corp.
JP2007041530A Machine Translation (by EPO and Google)—published Feb. 15, 2007; Fuji Xerox Co Ltd.
JP2007069584 Machine Translation (by EPO and Google)—published Mar. 22, 2007 Fujifilm.
JP2007079159A Machine Translation (by EPO and Google)—published Mar. 29, 2007; Ricoh KK.
JP2007083445A Machine Translation (by EPO and Google)—published Apr. 5, 2007; Fujifilm Corp.
JP2007216673 Machine Translation (by EPO and Google)—published Aug. 30, 2007 Brother Ind.
JP2007253347A Machine Translation (by EPO and Google)—published Oct. 4, 2007; Ricoh KK, Matsuo et al.
JP2008006816 Machine Translation (by EPO and Google)—published Jan. 17, 2008; Fujifilm Corp.
JP2008018716 Machine Translation (by EPO and Google)—published Jan. 31, 2008; Canon Inc.
JP2008137239A Machine Translation (by EPO and Google); published on Jun. 19, 2008, Kyocera Mita Corp.
JP2008139877A Machine Translation (by EPO and Google)—published Jun. 19, 2008; Xerox Corp.
JP2008142962 Machine Translation (by EPO and Google)—published Jun. 26, 2008; Fuji Xerox Co Ltd.
JP2008183744A Machine Translation (by EPO and Google)—published Aug. 14, 2008, Fuji Xerox Co Ltd.
JP2008194997A Machine Translation (by EPO and Google)—published Aug. 28, 2008; Fuji Xerox Co Ltd.
JP2008201564 Machine Translation (English machine translation)—published Sep. 4, 2008 Fuji Xerox Co Ltd.
JP2008238674A Machine Translation (by EPO and Google)—published Oct. 9, 2008; Brother Ind Ltd.
JP2008246990 Machine Translation (by EPO and Google)—published Oct. 16, 2008, Jujo Paper Co Ltd.
JP2008254203A Machine Translation (by EPO and Google)—published Oct. 23, 2008; Fujifilm Corp.
JP2008255135 Machine Translation (by EPO and Google)—published Oct. 23, 2008; Fujifilm Corp.
JP2009045794 Machine Translation (by EPO and Google)—published Mar. 5, 2009; Fujifilm Corp.
JP2009045851A Machine Translation (by EPO and Google); published on Mar. 5, 2009, Fujifilm Corp.
JP2009045885A Machine Translation (by EPO and Google)—published Mar. 5, 2009; Fuji Xerox Co Ltd.
JP2009083314 Machine Translation (by EPO, PlatPat and Google)—published Apr. 23, 2009 Fujifilm Corp.
JP2009083317 Abstract; Machine Translation (by EPO and Google)—published Apr. 23, 2009; Fuji Film Corp.
JP2009083325 Abstract; Machine Translation (by EPO and Google)—published Apr. 23, 2009 Fujifilm.
JP2009096175 Machine Translation (EPO, PlatPat and Google) published on May 7, 2009 Fujifilm CORP.
JP2009148908A Machine Translation (by EPO and Google)—published Jul. 9, 2009; Fuji Xerox Co Ltd.
JP2009154330 Machine Translation (by EPO and Google)—published Jul. 16, 2009; Seiko Epson Corp.
JP2009190375 Machine Translation (by EPO and Google)—published Aug. 27, 2009; Fuji Xerox Co Ltd.
JP2009202355 Machine Translation (by EPO and Google)—published Sep. 10, 2009; Fuji Xerox Co Ltd.
JP2009214318 Machine Translation (by EPO and Google)—published Sep. 24, 2009 Fuji Xerox Co Ltd.
JP2009214439 Machine Translation (by PlatPat English machine translation)—published Sep. 24, 2009 Fujifilm Corp.
JP2009226852 Machine Translation (by EPO and Google)—published Oct. 8, 2009; Hirato Katsuyuki, Fujifilm Corp.
JP2009233977 Machine Translation (by EPO and Google)—published Oct. 15, 2009; Fuji Xerox Co Ltd.
JP2009234219 Machine Translation (by EPO and Google)—published Oct. 15, 2009; Fujifilm Corp.
JP2010054855 Machine Translation (by PlatPat English machine translation)—published Mar. 11, 2010 Itatsu, Fuji Xerox Co.
JP2010105365 Machine Translation (by EPO and Google)—published May 13, 2010; Fuji Xerox Co Ltd.
JP2010173201 Abstract; Machine Translation (by EPO and Google)—published Aug. 12, 2010; Richo Co Ltd.
JP2010184376 Machine Translation (by EPO, PlatPat and Google)—published Aug. 26, 2010 Fujifilm Corp.
JP2010214885A Machine Translation (by EPO and Google)—published Sep. 30, 2010; Mitsubishi Heavy Ind Ltd.
JP2010228192 Machine Translation (by PlatPat English machine translation)—published Oct. 14, 2010 Fuji Xerox.
JP2010228392A Machine Translation (by EPO and Google)—published Oct. 14, 2010; Jujo Paper Co Ltd.
JP2010234599A Machine Translation (by EPO and Google)—published Oct. 21, 2010; Duplo Seiko Corp et al.
JP2010234681A Machine Translation (by EPO and Google)—published Oct. 21, 2010; Riso Kagaku Corp.
JP2010241073 Machine Translation (by EPO and Google)—published Oct. 28, 2010; Canon Inc.
JP2010247381A Machine Translation (by EPO and Google); published on Nov. 4, 2010, Ricoh Co Ltd.
JP2010258193 Machine Translation (by EPO and Google)—published Nov. 11, 2010; Seiko Epson Corp.
JP2010260204A Machine Translation (by EPO and Google)—published Nov. 18, 2010; Canon KK.
JP2010260287 Machine Translation (by EPO and Google)—published Nov. 18, 2010, Canon KK.
JP2010260302A Machine Translation (by EPO and Google)—published Nov. 18, 2010; Riso Kagaku Corp.
JP2011002532 Machine Translation (by PlatPat English machine translation)—published Jan. 6, 2011 Seiko Epson Corp.
JP2011025431 Machine Translation (by EPO and Google)—published Feb. 10, 2011; Fuji Xerox Co Ltd.
JP2011037070A Machine Translation (by EPO and Google)—published Feb. 24, 2011; Riso Kagaku Corp.
JP2011067956A Machine Translation (by EPO and Google)—published Apr. 7, 2011; Fuji Xerox Co Ltd.
JP2011126031A Machine Translation (by EPO and Google); published on Jun. 30, 2011, Kao Corp.
JP2011144271 Machine Translation (by EPO and Google)—published Jun. 28, 2011 Toyo Ink SC Holdings Co Ltd.
JP2011173325 Abstract; Machine Translation (by EPO and Google)—published Sep. 8, 2011; Canon Inc.
JP2011173326 Machine Translation (by EPO and Google)—published Sep. 8, 2011; Canon Inc.
JP2011186346 Machine Translation (by PlatPat English machine translation)—published Sep. 22, 2011 Seiko Epson Corp, Nishimura et al.
JP2011189627 Machine Translation (by Google Patents)—published Sep. 29, 2011; Canon KK.
JP2011201951A Machine Translation (by PlatPat English machine translation); published on Oct. 13, 2011, Shin-Etsu Chemical Co Ltd, Todoroki et al.
JP2011224032 Machine Translation (by EPO & Google)—published Nov. 10, 2011, Mameita KK.
JP2012086499 Machine Translation (by EPO and Google)—published May 10, 2012; Canon Inc.
JP2012111194 Machine Translation (by EPO and Google)—published Jun. 14, 2012; Konica Minolta.
JP2012196787A Machine Translation (by EPO and Google)—published Oct. 18, 2012; Seiko Epson Corp.
JP2012201419A Machine Translation (by EPO and Google)—published Oct. 22, 2012, Seiko Epson Corp.
JP2013001081 Machine Translation (by EPO and Google)—published Jan. 7, 2013; Kao Corp.
JP2013060299 Machine Translation (by EPO and Google)—published Apr. 4, 2013; Ricoh Co Ltd.

(56) References Cited

OTHER PUBLICATIONS

JP2013103474 Machine Translation (by EPO and Google)—published May 30, 2013; Ricoh Co Ltd.
JP2013121671 Machine Translation (by EPO and Google)—published Jun. 20, 2013; Fuji Xerox Co Ltd.
JP2013129158 Machine Translation (by EPO and Google)—published Jul. 4, 2013; Fuji Xerox Co Ltd.
JP2014047005A Machine Translation (by EPO and Google)—published Mar. 17, 2014; Ricoh Co Ltd.
JP2014094827A Machine Translation (by EPO and Google)—published May 22, 2014; Panasonic Corp.
JP2014131843A Machine Translation (by EPO and Google)—published Jul. 17, 2014; Ricoh Co Ltd.
JP2016185688A Machine Translation (by EPO and Google)—published Oct. 27, 2016; Hitachi Industry Equipment Systems Co Ltd.
JP2529651 B2 Machine Translation (by EPO and Google)—issued Aug. 28, 1996;Osaka Sealing Insatsu KK.
JPH03248170A Machine Translation (by EPO & Google)—published Nov. 6, 1991; Fujitsu Ltd.
JPH05147208 Machine Translation (by EPO and Google)—published Jun. 15, 1993-Mita Industrial Co Ltd.
JPH06100807 Machine Translation (by EPO and Google)—published Apr. 12, 1994; Seiko Instr Inc.
JPH06171076A Machine Translation (by PlatPat English machine translation)—published Jun. 21, 1994, Seiko Epson Corp.
JPH06345284A Machine Translation (by EPO and Google); published on Dec. 20, 1994, Seiko Epson Corp.
JPH06954A Machine Translation (by EPO and Google)—published Jan. 11, 1994; Seiko Epson Corp.
JPH07186453A Machine Translation (by EPO and Google)—published Jul. 25, 1995; Toshiba Corp.
JPH07238243A Machine Translation (by EPO and Google)—published Sep. 12, 1995; Seiko Instr Inc.
JPH08112970 Machine Translation (by EPO and Google)—published May 7, 1996; Fuji Photo Film Co Ltd.
JPH0862999A Machine Translation (by EPO & Google)—published Mar. 8, 1996 Toray Industries, Yoshida, Tomoyuki.
JPH09123432 Machine Translation (by EPO and Google)—published May 13, 1997, Mita Industrial Co Ltd.
JPH09157559A Machine Translation (by EPO and Google)—published Jun. 17, 1997; Toyo Ink Mfg Co.
JPH09281851A Machine Translation (by EPO and Google)—published Oct. 31, 1997; Seiko Epson Corp.
JPH09314867A Machine Translation (by PlatPat English machine translation)—published Dec. 9, 1997, Toshiba Corp.
JPH11106081A Machine Translation (by EPO and Google)—published Apr. 20, 1999; Ricoh KK.
JPH11245383A Machine Translation (by EPO and Google)—published Sep. 14, 1999; Xerox Corp.
JPH5297737 Machine Translation (by EPO & Google machine translation)—published Nov. 12, 1993 Fuji Xerox Co Ltd.
JPS5578904A Machine Translation (by EPO and Google)—published Jun. 14, 1980; Yokoyama Haruo.
JPS57121446U Machine Translation (by EPO and Google)—published Jul. 28, 1982.
JPS60199692A Machine Translation (by EPO and Google)—published Oct. 9, 1985; Suwa Seikosha KK.
JPS6076343A Machine Translation (by EPO and Google)—published Apr. 30, 1985; Toray Industries.
JPS6223783A Machine Translation (by EPO and Google)—published Jan. 31, 1987; Canon KK.
Larostat 264 A Quaternary Ammonium Compound, Technical Bulletin, BASF Corporation, Dec. 2002, p. 1.
Machine Translation (by EPO and Google) of JPH07112841 published on May 2, 1995 Canon KK.
Marconi Studios, Virtual SET Real Time; http://www.marconistudios.il/pages/virtualset_en.php.
Montuori G.M., et al., "Geometrical Patterns for Diagrid Buildings: Exploring Alternative Design Strategies From the Structural Point of View," Engineering Structures, Jul. 2014, vol. 71, pp. 112-127.
"Solubility of Alcohol", in http://www.solubilityofthings.com/water/alcohol; downloaded on Nov. 30, 2017.
Poly(vinyl acetate) data sheet. PolymerProcessing.com. Copyright 2010. http://polymerprocessing .com/polymers/PV AC.html.
Royal Television Society, The Flight of the Phoenix; https://rts.org.uk/article/flight-phoenix, Jan. 27, 2011.
RU2180675C2 Machine Translation (by EPO and Google)—published Mar. 20, 2002; Zao Rezinotekhnika.
RU2282643C1Machine Translation (by EPO and Google)—published Aug. 27, 2006; Balakovorezinotekhnika Aoot.
Technical Information Lupasol Types, Sep. 2010, 10 pages.
The Engineering Toolbox., "Dynamic Viscosity of Common Liquids," 2018, 4 pages.
Units of Viscosity published by Hydramotion Ltd. 1 York Road Park, Malton, York Y017 6YA, England; downloaded from www.hydramotion.com website on Jun. 19, 2017.
WO2006051733A1 Machine Translation (by EPO and Google)—published May 18, 2006; Konica Minolta Med & Graphic.
WO2010073916A1 Machine Translation (by EPO and Google)—published Jul. 1, 2010; Nihon Parkerizing [JP] et al.
WO2013087249 Machine Translation (by EPO and Google)—published Jun. 20, 2013; Koenig & Bauer AG.
Co-pending U.S. Appl. No. 18/261,852, filed Jul. 18, 2023.

* cited by examiner

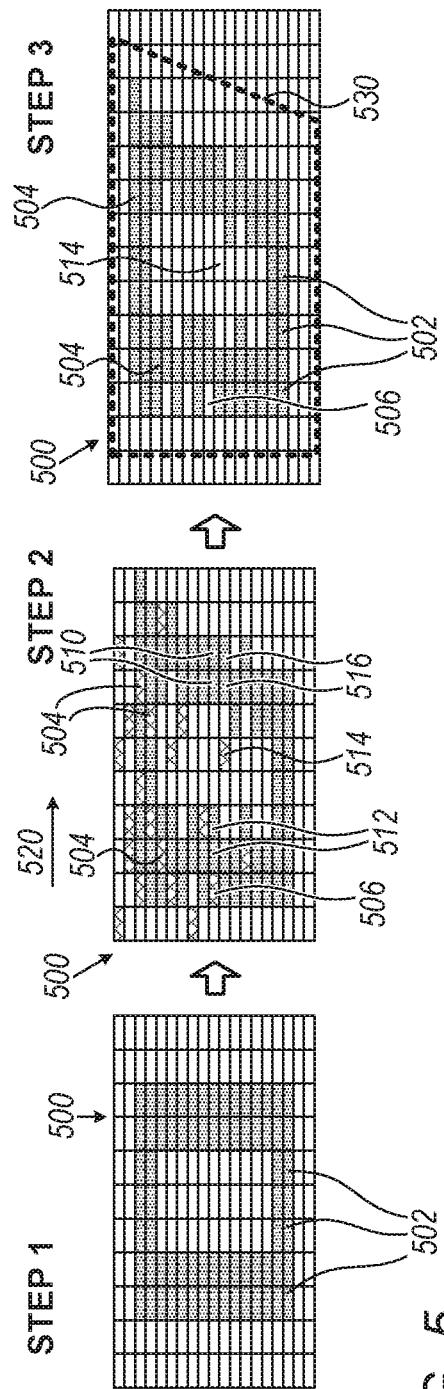
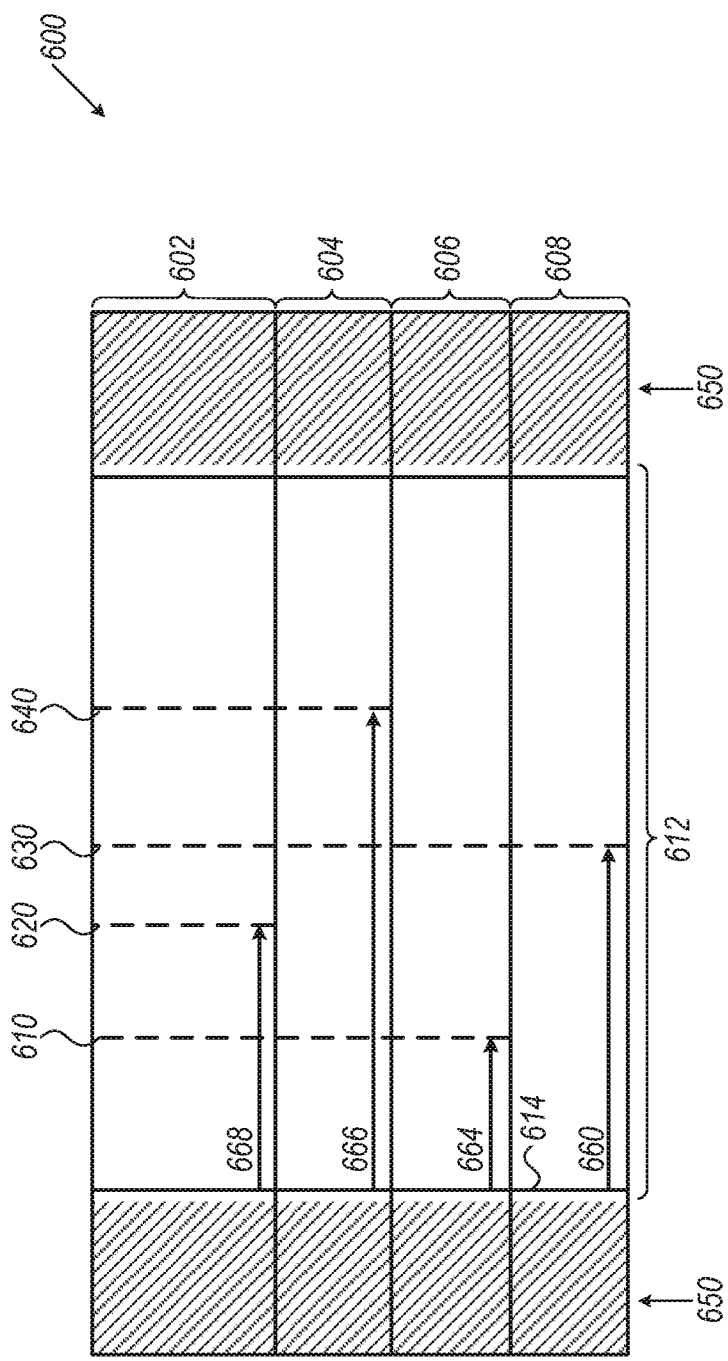
FIG. 5
FIG. 6

CORRECTING DISTORTIONS IN DIGITAL PRINTING BY IMPLANTING DUMMY PIXELS IN A DIGITAL IMAGE

This application is U.S. National Phase of PCT Application PCT/IB2019/056746, which claims the benefit of U.S. Provisional Patent Application 62/717,957, filed Aug. 13, 2018. The disclosures of these related applications are incorporated herein by reference.

FIELD OF THE INVENTION

The present invention relates generally to digital printing, and particularly to methods and systems for compensating for distortions in digitally printed images.

BACKGROUND OF THE INVENTION

Various methods and systems for correcting distortions in digitally printed images are known in the art.

For example, U.S. Pat. No. 6,966,712 describes a method and system including printing a test pattern on a print medium and generating a digital image of the printed test pattern using an imaging device. The method and system include analyzing an interference pattern to measure for distortion of the print medium and calibrating the printing device based upon the measured distortion.

U.S. Patent Application Publication 2017/0104887 describes an image processing apparatus that includes an image processing unit configured to execute, in forming an image on both surfaces of a sheet, image processing. The image processing includes skew correction to deform the image in advance to offset distortion to be caused in the image to be formed on the sheet.

U.S. Pat. No. 8,891,128 describes a defective recording element detecting apparatus. The apparatus includes a read image data acquiring device, a reference area setting device, a comparison area setting device, a correlation operation device, a distortion correction value determining device, an image distortion correcting device, and a defective recording element determining device.

SUMMARY OF THE INVENTION

An embodiment of the present invention that is described herein provides a method for correcting distortion in image printing, the method including receiving a digital image acquired from a printed image. Based on the digital image, a geometric distortion is estimated in the printed image. One or more pixel locations are calculated, such that, when one or more dummy pixels are implanted therein, compensate for the estimated geometric distortion. The geometric distortion is corrected in a subsequent digital image to be printed, by implanting the one or more dummy pixels at the one or more calculated pixel locations in the subsequent digital image. The subsequent digital image, having the corrected geometric distortion, is printed.

In some embodiments, implanting the one or more dummy pixels at a calculated pixel location includes shifting one or more existing pixels at a given pixel location by an amount of the implanted one or more dummy pixels. In other embodiments, at least one of the pixel locations includes a bar of pixels along a section of a column or row of the digital image, and correcting the geometrical distortion includes implanting the dummy pixels in the bar. In yet other embodiments, at least another of the pixel locations includes an additional bar of pixels located along an additional section of the row or column, and correcting the geometrical distortion includes implanting the dummy pixels in the additional bar.

In an embodiment, implanting the dummy pixels includes shifting the additional section relative to the section. In another embodiment, the digital image includes at least first and second colors, and correcting the geometric distortion includes correcting a difference between printed first and second widths of the first and second colors, respectively. In yet another embodiment, correcting the geometric distortion includes compensating for a trapeze shape of a print of the digital image.

In some embodiments, estimating the geometric distortion includes comparing at least part of the printed image with a reference image. In other embodiments, the method includes, based on the digital image, qualifying or disqualifying at least one of the printed image and a print of the subsequent digital image. In yet other embodiments, the method includes, based on the digital image, estimating at least an additional geometric distortion of the printed image relative to a source image used for printing the printed image.

In an embodiment, the additional geometric distortion includes a tilt of the printed image relative to the source image, and the method includes, correcting the tilt by applying, to the source image, a pre-compensation for the tilt. In another embodiment, the additional geometric distortion includes a color to color position difference between first and second colors of the printed image, and the method includes correcting the color to color position difference by shifting, in the subsequent digital image, at least one of the first and second colors. In yet another embodiment, the digital image includes at least first and second color images, and the method includes aligning an edge of the first and second color images to one another by shifting the edge of the second color image to align with the edge of the first color image.

In some embodiments, the digital image includes multiple color images, and implanting the one or more dummy pixels includes, for a given dummy pixel at a given pixel location in a given color image, setting a waveform that determines a size of the given dummy pixel based on one or more selected pixels adjacent to the given pixel location, and printing the subsequent digital image includes printing the given dummy pixel in accordance with the waveform. In other embodiments, the digital image includes multiple registration marks, and estimating the geometric distortion includes analyzing the geometric distortion between the registration marks.

In an embodiment, the digital image includes registration marks in at least one of: (i) a margin of the digital image and (ii) an interior of the digital image. In another embodiment, at least two of the registration marks include a bar of the registration marks arranged along a section of a column of the digital image.

There is additionally provided, in accordance with an embodiment of the present invention, an apparatus for correcting distortion in image printing, the apparatus includes an interface and a processor. The interface is configured to receive a digital image acquired from a printed image. The processor is configured to: (a) estimate, based on the digital image, a geometric distortion in the printed image, (b) calculate one or more pixel locations that, when one or more dummy pixels are implanted therein, compensate for the estimated geometric distortion, and (c) correct the geometric distortion in a subsequent digital image to be printed, by implanting the one or more dummy pixels at the one or more calculated pixel locations in the subsequent digital image.

There is additionally provided, in accordance with an embodiment of the present invention, a system including a processor and a printing subsystem. The processor is configured to: (a) receive a digital image acquired from a printed image, (b) estimate, based on the digital image, a geometric distortion in the printed image, (c) calculate one or more pixel locations that, when one or more dummy pixels are implanted therein, compensate for the estimated geometric distortion, and (d) correct the geometric distortion in a subsequent digital image to be printed, by implanting the one or more dummy pixels at the one or more calculated pixel locations in the subsequent digital image. The printing subsystem is configured to print the subsequent digital image having the corrected geometric distortion.

There is further provided, in accordance with an embodiment of the present invention, a computer software product, the product including a tangible non-transitory computer-readable medium, in which program instructions are stored, which instructions, when read by a processor, cause the processor to: (a) receive a digital image acquired from a printed image, (b) estimate, based on the digital image, a geometric distortion in the printed image, (c) calculate one or more pixel locations that, when one or more dummy pixels are implanted therein, compensate for the estimated geometric distortion, and (d) correct the geometric distortion in a subsequent digital image to be printed, by implanting the one or more dummy pixels at the one or more calculated pixel locations in the subsequent digital image.

There is additionally provided, in accordance with an embodiment of the present invention, a printing system including a printing subsystem and a processor. The printing subsystem includes an intermediate transfer member (ITM) configured to receive ink droplets from an image forming station to form an ink image thereon, and to form a printed image by transferring the ink image to a target substrate. The processor is configured to: (a) receive a digital image acquired from the printed image, (b) estimate, based on the digital image, a geometric distortion in the printed image, (c) calculate one or more pixel locations that, when one or more dummy pixels are implanted therein, compensate for the estimated geometric distortion, and (d) correct the geometric distortion in a subsequent digital image to be printed, by implanting the one or more dummy pixels at the one or more calculated pixel locations in the subsequent digital image. The printing subsystem is configured to print the subsequent digital image having the corrected geometric distortion.

There is further provided, in accordance with an embodiment of the present invention, a method for correcting distortion in image printing, the method including printing a printed image by applying, to an intermediate transfer member (ITM), ink droplets from an image forming station to form an ink image thereon, and transferring the ink image from the ITM to a target substrate. A digital image that is acquired from the printed image, is received. Based on the digital image, a geometric distortion is estimated in the printed image. One or more pixel locations are calculated, such that, when one or more dummy pixels are implanted therein, compensate for the estimated geometric distortion. The geometric distortion is corrected in a subsequent digital image to be printed, by implanting the one or more dummy pixels at the one or more calculated pixel locations in the subsequent digital image. The subsequent digital image having the corrected geometric distortion, is printed.

There is additionally provided, in accordance with an embodiment of the present invention, a method for correcting distortion in image printing, the method including receiving a digital image acquired from a printed image. Based on the digital image, a geometric distortion is estimated in the printed image. One or more pixel locations are calculated, such that, when one or more given pixels are removed from the digital image, compensate for the estimated geometric distortion. The geometric distortion is corrected in a subsequent digital image to be printed, by removing the one or more given pixels at the one or more calculated pixel locations in the subsequent digital image. The subsequent digital image having the corrected geometric distortion, is printed.

There is additionally provided, in accordance with an embodiment of the present invention, a system including a processor and a printing subsystem. The processor is configured to: (a) receive a digital image acquired from a printed image, (b) estimate, based on the digital image, a geometric distortion in the printed image, (c) calculate one or more pixel locations that, when one or more given pixels are removed from the digital image, compensate for the estimated geometric distortion, and (d) correct the geometric distortion in a subsequent digital image to be printed, by removing the one or more given pixels at the one or more calculated pixel locations in the subsequent digital image. The printing subsystem is configured to print the subsequent digital image having the corrected geometric distortion.

The present invention will be more fully understood from the following detailed description of the embodiments thereof, taken together with the drawings in which:

BRIEF DESCRIPTION OF THE DRAWINGS

FIG. 5 is a schematic, pictorial illustration of a method for implanting dummy pixels in an image to be printed in a digital printing system, in accordance with an embodiment of the present invention;

FIG. 6 is a schematic, pictorial illustration of a method for setting pixel locations in a digital image to be printed in a digital printing system, in accordance with an embodiment of the present invention;

DETAILED DESCRIPTION OF EMBODIMENTS

Overview

Figure 1:
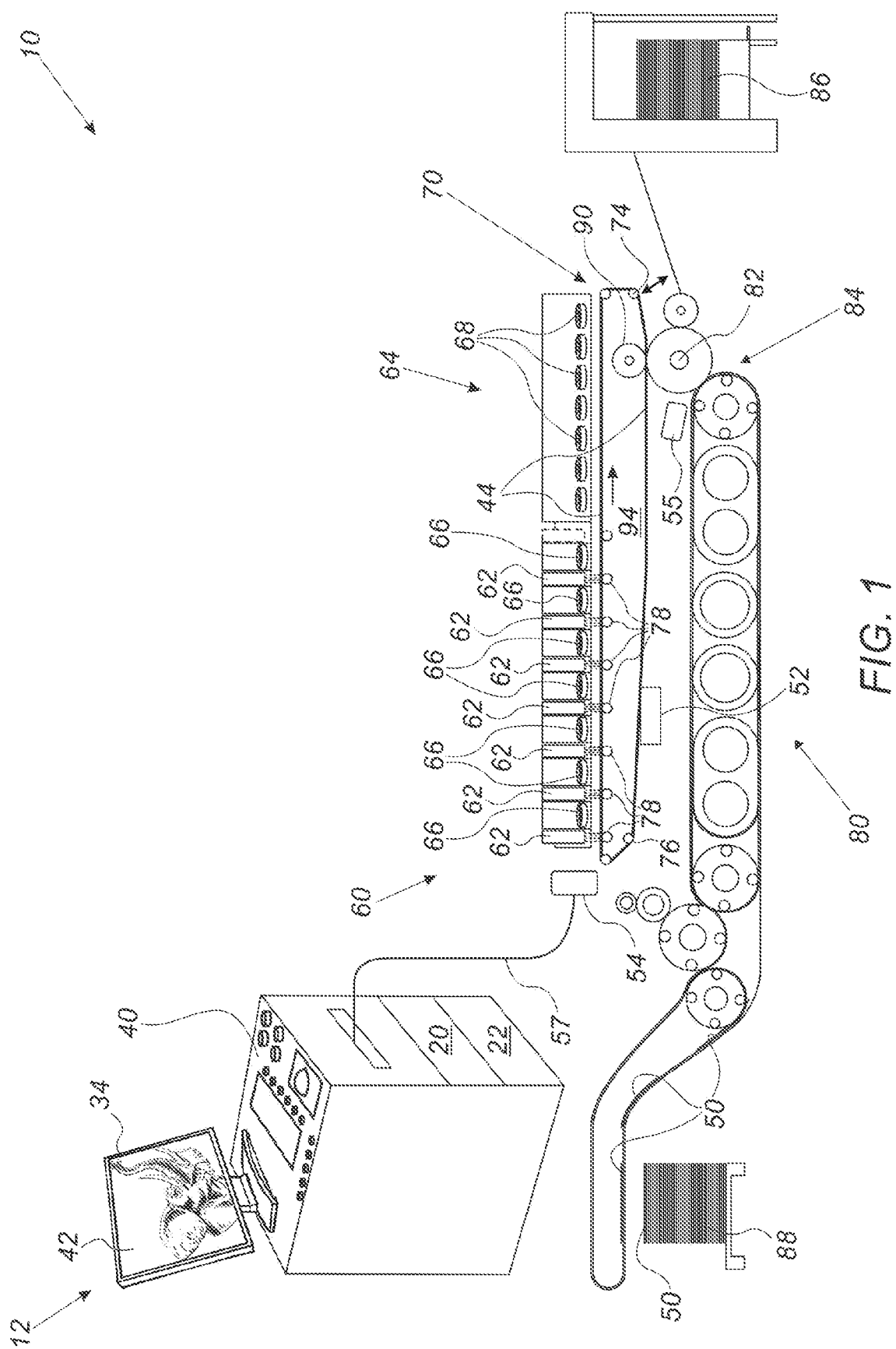
FIG. 1 is a schematic side view of a digital printing system, in accordance with an embodiment of the present invention.

Embodiments of the present invention that are described hereinbelow provide methods and apparatus for correcting distortions in printing of a digital image. In some embodiments, a digital printing system comprises a flexible intermediate transfer member (ITM) configured to receive an ink image and to move along an axis, referred to herein as an X axis, to an impression station so as to transfer the ink image to a target substrate, such as a paper sheet.

The printed image may have geometric distortions along the X axis that change with the position on a Y axis (orthogonal to the X axis), referred to herein as wave X(Y), and/or distortions along the Y axis that change with the position on the X axis, referred to herein as wave Y(X).

The wave Y(X) distortion may be caused by multiple sources, such as bending and stretching of the ITM, deviation from the specified velocity at the impression station, misalignment between color images, also referred to herein as "bar to bar position delta," and different widths of similar features among the different color images referred to herein as "bar to bar width delta" or as "color to color width difference." The digital image may have additional distortions, such as trapeze shape, tilt, skew, and displacement of the digital image relative to the substrate, for example in Y axis, also referred to herein as "image to substrate Y" (Im2SubY).

In some embodiments, the digital printing system comprises a processor configured to receive a digital image acquired from a printed image. The printed image was printed by the digital printing system as a composition of multiple color images such as cyan, magenta, yellow and black. The processor is configured to estimate, based on the digital image, one or more types of the geometric distortions described above, to apply, to the distorted digital image, shifting of pixels and implanting of synthetic pixels, also referred to herein as "dummy pixels" so as to compensate for the distortions, and to produce a subsequent digital image that corrects the geometric distortion. In some embodiments, the subsequent digital image is printed and an additional digital image is acquired so as to check whether the distortions have indeed been corrected.

In some embodiments, the digital image comprises registration marks located at first (e.g., left) and second (e.g., right) opposite edges along the Y axis of the digital image. The registration marks are indicative of at least some of the distortions described above. In some embodiments, the processor is configured to identify, based on the distorted registration marks, at least some of the distortions in the digital image and to apply, to one or more of the color images, a linear offset and/or non-linear shifting so as to compensate for various distortions, such as, tilt, skew, Im2SubY and other wavy articles.

In some embodiments, the processor is further configured to identify, based on the distorted registration marks at the first end, bar to bar position delta distortions between the different color images, and to shift at least one of the color images so as to align the first end of all the color images.

Subsequently, the processor identifies, based on the registration marks at the second end, distortions of the bar to bar width delta between the color images, and calculates, at one or more of the color images, pixel locations and the amount of dummy pixels implanted therein so as to compensate for the bar to bar width delta between the color images (which may also vary along X axis, per color).

The disclosed techniques improve the quality of printed digital images by compensating for a large variety of distortions. Moreover, the disclosed techniques reduce waste of substrate and ink by improving the yield of the printed substrates.

System Description

FIG. 1 is a schematic side view of a digital printing system 10, in accordance with an embodiment of the present invention. In some embodiments, system 10 comprises a rolling flexible blanket 44 that cycles through an image forming station 60, a drying station 64, an impression station 84 and a blanket treatment station 52. In the context of the present invention and in the claims, the terms "blanket" and "intermediate transfer member (ITM)" are used interchangeably and refer to a flexible member comprising one or more layers used as an intermediate member configured to receive an ink image and to transfer the ink image to a target substrate, as will be described in detail below.

In an operative mode, image forming station 60 is configured to form a mirror ink image, also referred to herein as "an ink image" (not shown), of a digital image 42 on an upper run of a surface of blanket 44. Subsequently the ink image is transferred to a target substrate, (e.g., a paper, a folding carton, or any suitable flexible package in a form of sheets or continuous web) located under a lower run of blanket 44.

In the context of the present invention, the term "run" refers to a length or segment of blanket 44 between any two given rollers over which blanket 44 is guided.

In some embodiments, during installation blanket 44 may be adhered edge to edge to form a continuous blanket loop (not shown). An example of a method and a system for the installation of the seam is described in detail in U.S. Provisional Application 62/532,400, whose disclosure is incorporated herein by reference.

In some embodiments, image forming station 60 typically comprises multiple print bars 62, each mounted (e.g., using a slider) on a frame (not shown) positioned at a fixed height above the surface of the upper run of blanket 44. In some embodiments, each print bar 62 comprises a strip of print heads as wide as the printing area on blanket 44 and comprises individually controllable print nozzles.

In some embodiments, image forming station 60 may comprise any suitable number of bars 62, each bar 62 may contain a printing fluid, such as an aqueous ink of a different color. The ink typically has visible colors, such as but not limited to cyan, magenta, red, green, blue, yellow, black and white. In the example of FIG. 1, image forming station 60 comprises seven print bars 62, but may comprise, for example, four print bars 62 having any selected colors such as cyan, magenta, yellow and black.

In some embodiments, the print heads are configured to jet ink droplets of the different colors onto the surface of blanket 44 so as to form the ink image (not shown) on the surface of blanket 44.

In some embodiments, different print bars 62 are spaced from one another along the movement axis of blanket 44, represented by an arrow 94. In this configuration, accurate spacing between bars 62, and synchronization between directing the droplets of the ink of each bar 62 and moving blanket 44 are essential for enabling correct placement of the image pattern.

In the context of the present disclosure and in the claims, the terms "inter-color pattern placement," "pattern placement accuracy," "color-to-color registration," "C2C registration" "bar to bar registration." and "color registration" are used interchangeably and refer to any placement accuracy of two or more colors relative to one another.

In some embodiments, system 10 comprises heaters, such as hot gas or air blowers 66, which are positioned in between print bars 62, and are configured to partially dry the ink droplets deposited on the surface of blanket 44. This hot air flow between the print bars may assist, for example, in reducing condensation at the surface of the print heads and/or in handling satellites (e.g., residues or small droplets distributed around the main ink droplet), and/or in preventing blockage of the inkjet nozzles of the print heads, and/or in preventing the droplets of different color inks on blanket 44 from undesirably merging into one another. In some embodiments, system 10 comprises a drying station 64, configured to blow hot air (or another gas) onto the surface of blanket 44. In some embodiments, drying station comprises air blowers 68 or any other suitable drying apparatus.

In drying station 64, the ink image formed on blanket 44 is exposed to radiation and/or to hot air in order to dry the ink more thoroughly, evaporating most or all of the liquid carrier and leaving behind only a layer of resin and coloring agent which is heated to the point of being rendered tacky ink film.

In some embodiments, system 10 comprises a blanket module 70 comprising a rolling ITM, such as a blanket 44. In some embodiments, blanket module 70 comprises one or more rollers 78, wherein at least one of rollers 78 comprises an encoder (not shown), which is configured to record the position of blanket 44, so as to control the position of a section of blanket 44 relative to a respective print bar 62. In some embodiments, the encoder of roller 78 typically comprises a rotary encoder configured to produce rotary-based position signals indicative of an angular displacement of the respective roller.

Additionally or alternatively, blanket 44 may comprise an integrated encoder (not shown) for controlling the operation of various modules of system 10. The integrated encoder is described in detail, for example, in U.S. Provisional Application 62/689,852, whose disclosure is incorporated herein by reference.

In some embodiments, blanket 44 is guided over rollers 76 and 78 and a powered tensioning roller, also referred to herein as a dancer 74. Dancer 74 is configured to control the length of slack in blanket 44 and its movement is schematically represented by a double sided arrow. Furthermore, any stretching of blanket 44 with aging would not affect the ink image placement performance of system 10 and would merely require the taking up of more slack by tensioning dancer 74.

In some embodiments, dancer 74 may be motorized. The configuration and operation of rollers 76 and 78, and dancer 74 are described in further detail, for example, in U.S. Patent Application Publication 2017/0008272 and in the above-mentioned PCT International Publication WO 2013/132424, whose disclosures are all incorporated herein by reference.

In impression station 84, blanket 44 passes between an impression cylinder 82 and a pressure cylinder 90, which is configured to carry a compressible blanket.

In some embodiments, system 10 comprises a control console 12, which is configured to control multiple modules of system 10, such as blanket module 70, image forming station 60 located above blanket module 70, and a substrate transport module 80 located below blanket module 70.

In some embodiments, console 12 comprises a processor 20, typically a general-purpose computer, with suitable front end and interface circuits for interfacing with a controller 54, via a cable 57, and for receiving signals therefrom. In some embodiments, controller 54, which is schematically shown as a single device, may comprise one or more electronic modules mounted on system 10 at predefined locations. At least one of the electronic modules of controller 54 may comprise an electronic device, such as control circuitry or a processor (not shown), which is configured to control various modules and stations of system 10. In some embodiments, processor 20 and the control circuitry may be programmed in software to carry out the functions that are used by the printing system, and store data for the software in a memory 22. The software may be downloaded to processor 20 and to the control circuitry in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, a digital image 42 comprising one or more segments (not shown) of image 42 and various types of test patterns (described in detail below) stored in memory 22.

In some embodiments, blanket treatment station 52, also referred to herein as a cooling station, is configured to treat the blanket by, for example, cooling it and/or applying a treatment fluid to the outer surface of blanket 44, and/or cleaning the outer surface of blanket 44. At blanket treatment station 52 the temperature of blanket 44 can be reduced to a desired value before blanket 44 enters image forming station 60. The treatment may be carried out by passing blanket 44 over one or more rollers or blades configured for applying cooling and/or cleaning and/or treatment fluid on the outer surface of the blanket. In some embodiments, processor 20 is configured to receive, e.g., from temperature sensors (not shown), signals indicative of the surface temperature of blanket 44, so as to monitor the temperature of blanket 44 and to control the operation of blanket treatment station 52. Examples of such treatment stations are described, for example, in PCT International Publications WO 2013/132424 and WO 2017/208152, whose disclosures are all incorporated herein by reference.

Additionally or alternatively, treatment fluid may be applied by jetting, prior to the ink jetting at the image forming station.

In the example of FIG. 1, station 52 is mounted between roller 78 and roller 76, yet, station 52 may be mounted adjacent to blanket 44 at any other suitable location between impression station 84 and image forming station 60.

In the example of FIG. 1, impression cylinder 82 impresses the ink image onto the target flexible substrate, such as an individual sheet 50, conveyed by substrate transport module 80 from an input stack 86 to an output stack 88 via impression cylinder 82.

In some embodiments, the lower run of blanket 44 selectively interacts at impression station 84 with impression cylinder 82 to impress the image pattern onto the target flexible substrate compressed between blanket 44 and impression cylinder 82 by the action of pressure of pressure cylinder 90. In the case of a simplex printer (i.e., printing on one side of sheet 50) shown in FIG. 1, only one impression station 84 is needed.

In other embodiments, module 80 may comprise two impression cylinders so as to permit duplex printing. This configuration also enables conducting single sided prints at twice the speed of printing double sided prints. In addition, mixed lots of single and double sided prints can also be printed. In alternative embodiments, a different configuration of module 80 may be used for printing on a continuous web substrate. Detailed descriptions and various configurations of duplex printing systems and of systems for printing on continuous web substrates are provided, for example, in U.S. Pat. Nos. 9,914,316 and 9,186,884, in PCT International Publication WO 2013/132424, in U.S. Patent Application Publication 2015/0054865, and in U.S. Provisional Application 62/596,926, whose disclosures are all incorporated herein by reference.

As briefly described above, sheets 50 or continuous web substrate (not shown) are carried by module 80 from input stack 86 and pass through the nip (not shown) located between impression cylinder 82 and pressure cylinder 90. Within the nip, the surface of blanket 44 carrying the ink image is pressed firmly, e.g., by compressible blanket (not shown), of pressure cylinder 90 against sheet 50 (or other suitable substrate) so that the ink image is impressed onto the surface of sheet 50 and separated neatly from the surface of blanket 44. Subsequently, sheet 50 is transported to output stack 88.

In the example of FIG. 1, rollers 78 are positioned at the upper run of blanket 44 and are configured to maintain blanket 44 taut when passing adjacent to image forming station 60. Furthermore, it is particularly important to control the speed of blanket 44 below image forming station 60 so as to obtain accurate jetting and deposition of the ink droplets, thereby placement of the ink image, by forming station 60, on the surface of blanket 44.

In some embodiments, impression cylinder 82 is periodically engaged to and disengaged from blanket 44 to transfer the ink images from moving blanket 44 to the target substrate passing between blanket 44 and impression cylinder 82. In some embodiments, system 10 is configured to apply torque to blanket 44 using the aforementioned rollers and dancers, so as to maintain the upper run taut and to substantially isolate the upper run of blanket 44 from being affected by any mechanical vibrations occurred in the lower run.

In some embodiments, system 10 comprises an image quality control station 55, also referred to herein as an automatic quality management (AQM) system, which serves as a closed loop inspection system integrated in system 10. In some embodiments, station 55 may be positioned adjacent to impression cylinder 82, as shown in FIG. 1, or at any other suitable location in system 10.

In some embodiments, station 55 comprises a camera (not shown), which is configured to acquire one or more digital images of the aforementioned ink image printed on sheet 50. In some embodiments, the camera may comprises any suitable image sensor, such as a Contact Image Sensor (CIS) or a Complementary metal oxide semiconductor (CMOS) image sensor, and a scanner comprising a slit having a width of about one meter or any other suitable width.

In some embodiments, station 55 may comprise a spectrophotometer (not shown) configured to monitor the quality of the ink printed on sheet 50.

In some embodiments, the digital images acquired by station 55 are transmitted to a processor, such as processor 20 or any other processor of station 55, which is configured to assess the quality of the respective printed images. Based on the assessment and signals received from controller 54, processor 20 is configured to control the operation of the modules and stations of system 10. In the context of the present invention and in the claims, the term "processor" refers to any processing unit, such as processor 20 or any other processor connected to or integrated with station 55, which is configured to process signals received from the camera and/or the spectrophotometer of station 55. Note that the signal processing operations, control-related instructions, and other computational operations described herein may be carried out by a single processor, or shared between multiple processors of one or more respective computers.

In some embodiments, station 55 is configured to inspect the quality of the printed images and test pattern so as to monitor various attributes, such as but not limited to full image registration with sheet 50, color-to-color registration, printed geometry, image uniformity, profile and linearity of colors, and functionality of the print nozzles. In some embodiments, processor 20 is configured to automatically detect geometrical distortions or other errors in one or more of the aforementioned attributes. For example, processor 20 is configured to compare between a design version (also referred to herein as a source image) of a given digital image and a digital image of the printed version of the given image, which is acquired by the camera.

In other embodiments, processor 20 may apply any suitable type image processing software, e.g., to a test pattern, for detecting distortions indicative of the aforementioned errors. In some embodiments, processor 20 is configured to analyze the detected distortion in order to apply a corrective action to the malfunctioning module, and/or to feed instructions to another module or station of system 10, so as to compensate for the detected distortion.

In some embodiments, by acquiring images of the testing marks printed at the bevels of sheet 50, station 55 is configured to measure various types of distortions, such as C2C registration, image-to-substrate registration, different width between colors referred to herein as "bar to bar width delta" or as "color to color width difference", various types of local distortions, and front-to-back registration errors (in duplex printing). In some embodiments, processor 20 is configured to: (i) sort out, e.g., to a rejection tray (not shown), sheets 50 having a distortion above a first predefined set of thresholds, (ii) initiate corrective actions for sheets 50 having a distortion above a second, lower, predefined set of threshold, and (iii) output sheets 50 having minor distortions, e.g., below the second set of thresholds, to output stack 88.

In some embodiments, processor 20 is further configured to detect, e.g., by analyzing a pattern of the printed inspection marks, additional geometric distortion such as scaling up or down, skew, or a wave distortion formed in at least one of an axis parallel to and an axis orthogonal to the movement axis of blanket 44 as will be described in detail in FIGS. 2A, 2B, and 3-8 below.

In some embodiments, processor 20 is configured to analyze the signals acquired by station 55 so as to monitor the nozzles of image forming station 60. By printing a test pattern of each color of station 60, processor 20 is configured to identify various types of defects indicative of malfunctions in the operation of the respective nozzles.

For example, absence of ink in a designated location in the test pattern is indicative of a missing or blocked nozzle. A shift of a printed pattern (relative to the original design, also referred to herein as a source image) is indicative of inaccurate positioning of a respective print bar 62 or of one or more nozzles of the respective print bar. Non-uniform thickness of a printed feature of the test pattern is indicative of width differences between respective print bars 62, referred to above as bar to bar width delta.

In some embodiments, processor 20 is configured to detect, based on signals received from the spectrophotometer of station 55, deviations in the profile and linearity of the printed colors.

In some embodiments, processor 20 is configured to detect, based on the signals acquired by station 55, various types of defects: (i) in the substrate (e.g., blanket 44 and/or sheet 50), such as a scratch, a pin hole, and a broken edge, and (ii) printing-related defects, such as irregular color spots, satellites, and splashes.

In some embodiments, processor 20 is configured to detect these defects by comparing between a section of the printed and a respective reference section of the original design, also referred to herein as a master or a source image. Processor 20 is further configured to classify the defects, and, based on the classification and predefined criteria, to reject sheets 50 having defects that are not within the specified predefined criteria.

In some embodiments, the processor of station 55 is configured to decide whether to stop the operation of system 10, for example, in case the defect density is above a specified threshold. The processor of station 55 is further configured to initiate a corrective action in one or more of the modules and stations of system 10, as described above. The corrective action may be carried out on-the-fly (while system 10 continue the printing process), or offline, by stopping the printing operation and fixing the problem in a respective modules and/or station of system 10. In other embodiments, any other processor or controller of system 10 (e.g., processor 20 or controller 54) is configured to start a corrective action or to stop the operation of system 10 in case the defect density is above a specified threshold.

Additionally or alternatively, processor 20 is configured to receive, e.g., from station 55, signals indicative of additional types of defects and problems in the printing process of system 10. Based on these signals processor 20 is configured to automatically estimate the level of pattern placement accuracy and additional types of defects not mentioned above. In other embodiments, any other suitable method for examining the pattern printed on sheets 50 (or on any other substrate described above), can also be used, for example, using an external (e.g., offline) inspection system, or any type of measurements jig and/or scanner. In these embodiments, based on information received from the external inspection system, processor 20 is configured to initiate any suitable corrective action and/or to stop the operation of system 10.

The configuration of system 10 is simplified and provided purely by way of example for the sake of clarifying the present invention. The components, modules and stations described in printing system 10 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

The particular configurations of system 10 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems.

Figure 2A:
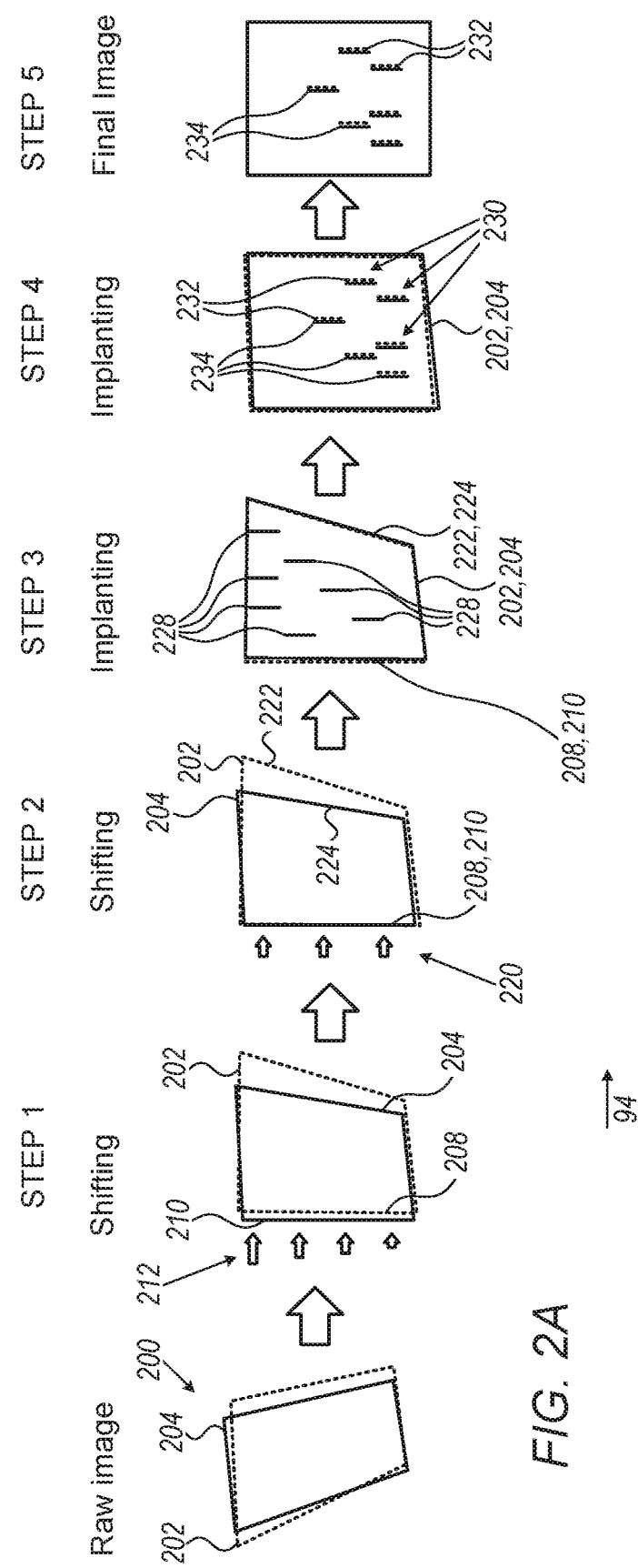
FIG. 2A is a schematic, pictorial illustration of a process sequence for correcting distortions in an image printed in a digital printing system, in accordance with an embodiment of the present invention.

Correcting Distortions in a Digital Image as was Printed by a Digital Printing System FIG. 2A is a schematic, pictorial illustration of a process sequence for correcting distortions in a digital image 200 to be printed in system 10, in accordance with an embodiment of the present invention. In the example of FIG. 2A, image 200 comprises two color images and therefore may replace, for example, a subset of image 42 of FIG. 1 above.

Note that the description of FIG. 2A is an overview of the entire process sequence and therefore the steps are described briefly. Detailed description of each step are provided in FIGS. 2B and 3-8 below. The disclosed techniques are applied to correct various types of distortions, such as local distortions and continuous wave distortions described herein.

Wave Distortion

The phenomena of wave distortion is caused by various errors, such as but not limited to (i) erroneous positioning of one or more print bars 62 in image forming station 60 (ii) deviation from the specified motion profile of blanket 44, and (iii) deviation from the specified relative velocity between blanket 44 and sheet 50 at impression station 84. As described above, print bars 62 are positioned at a predefined distance from one another along the movement axis of blanket 44, which is represented by arrow 94 and also referred to herein as X axis. Each print bar 62 is mounted on the frame on an axis orthogonal to arrow 94, referred to herein as Y axis.

The distortions described above, and additional errors, may result in a wavy pattern of the printed features. Note that typically the wavy pattern has two components: (i) a common wave of all colors. e.g., due to the aforementioned deviation at impression station 84, and (ii) different waves formed in each color image are caused, for example, by the erroneous positioning of one or more print bars 62 and/or due to temporary variation in the velocity of blanket 44, for example, when the upper run passes between the black and the cyan print bars.

Additional types of distortions may cause deviation of the printed width between bars, also referred to as bar to bar width delta, and/or shift (e.g., in Y axis) of the position of the droplets jetted by at least one bar, also referred to herein as "bar to bar Y position delta" or as "color to color position difference." Based on the above, the wave distortion has two components, distortion along X axis that changes with the position on Y axis, referred to herein as wave X(Y), and distortion along Y axis that changes with the position on X axis, referred to herein as wave Y(X). Further details about the distortion and correction of waves X(Y) and Y(X) are depicted in FIGS. 2A, 2B and 3-8 below.

Compensating for the Local and Wave Distortions

The process sequence for correcting the wave distortion begins with a schematic illustration of digital image 200. As described in FIG. 1 above, module 55 acquires a digital image from an image printed by system 10. As mentioned above, image 200 is a subset of the acquired digital image for having two colors, e.g., a magenta image 202 shown as a dashed-line polygon, and a cyan image 204 shown as a solid-line polygon. Embodiments of the present invention that are described below, depict distortion and correction processes carried out only in the cyan and magenta colors for the sake of conceptual clarity. However, the same embodiments are applicable for any number of colors described, for example, in FIG. 1 above.

In the example distortion shown in image 200, images 202 and 204 have, relative to one another, bar to bar position delta in Y axis, and bar to bar width delta. In addition, at least one of images 202 and 204 has one or more additional distortions, such as (a) a trapeze-shape, (b) tilt, (c) a displacement in Y axis relative to the substrate (e.g., sheet 50), also referred to herein as Im2SubY, and (d) a displacement of a given color in X axis relative to any suitable reference, e.g., another color, also referred to herein as bar to bar Y position delta.

In some embodiments, at a step 1 processor 20 applies, to at least one of images 202 and 204, a linear offset and/or a non-linear shifting so as to compensate for part of the wave Y(X) distortion caused, for example, by bending and stretching of the flexible ITM and from deviation from the specified velocity at impression station 84.

In some embodiments, processor 20 is configured to estimate, based on image 200 and relative to the source image mentioned in FIG. 1 above, at least an additional geometric distortion of the printed image that is used for printing the printed image. The additional geometric distortion may comprise, for example, a tilt of the printed image relative to the source image. In such embodiments, processor 20 is configured to correct the tilt by applying, to the source image, a pre-compensation for the tilt. Processor 20 is further configured to compensate for the tilt and Im2SubY in any of images 202 and 204 using linear offset or any other suitable technique. Note that the shifting and offset carried out at step 1, which are represented by arrows 212, may differ along left ends 208 and 210 also referred to herein as left edges, which are located at the left edge of respective images 202 and 204, as shown by the non-uniform length of arrows 212.

In an embodiment, at a step 2 processor 20 corrects the bar to bar Y position delta between the respective magenta and cyan print bars. In this embodiment, processor 20 shifts images 202 and 204 relative to one another, as shown by arrows 220 having similar length, thereby aligning respective ends 208 and 210 with one another. In some embodiments, processor 20 may select, among all color images, a reference image as the image mostly shifted along Y axis. In the example of step 1, end 208 serves as a reference so that end 210 is shifted in the direction of arrow 94, also referred to herein as the right direction.

In some embodiments, processor 20 is configured to carry out steps 1 and 2 simultaneously. In other embodiments, steps 1 and 2 may be carried out sequentially, in the order described above, or in a reversed order in which step 2 is carried out before step 1. After concluding steps 1 and 2, magenta image 202 and cyan image 204 are aligned at respective ends 208 and 210, yet, other ends, such as respective ends 222 and 224 are not aligned due to a geometric distortion, such as bar to bar width delta between cyan image 204 and magenta image 202. The bar to bar width delta may also appear as a trapeze shape or as a trapeze additionally distorted by other types of linear and/or non-linear distortions, or as a distortion having any other type of linear or non-linear shape, of at least one of images 202 and 204 as shown at step 2.

In some embodiments, at a step 3 processor 20 identifies, based on image 200, which color image among images 202 and 204 has the largest print bar width. In other words, the processor identifies which print bar 62 is jetting droplets that eventually print the broadest pixels or pixel bars.

As shown at step 2, the dashed line of magenta image 202 has the largest width among all colors images. Note that in the example of FIG. 2A there are only two colors, but in real-life there are typically 4-7 color images, from which the magenta image has the largest width. In an embodiment, the image having the largest print bar width may serve as a reference for all other colors, each of which has a distortion relative to the reference image. In the example of FIG. 2A, magenta image 202 serves as the reference. In this embodiment, based on the color images of step 2, processor 20 estimates the geometric distortion of cyan image 204 relative to magenta image 202.

In some embodiments, processor 20 is configured to calculate, at image 204, one or more pixel locations 228, such that when one or more dummy pixels are implanted in the cyan image at locations 228, the implanted dummy pixels compensate for the estimated geometric distortion of cyan image 204 relative to magenta image 202. As shown at step 3, the dummy pixels are implanted at pixel locations 228 so as to compensate for the geometric distortion of cyan image 202. As a result of the dummy pixel implantation, end 224 of cyan image 204 is moved towards end 222 of magenta image 202, and eventually is aligned therewith.

After implanting the dummy pixels at locations 228, images 202 and 204 are aligned with one another, but have a trapeze shape or any other shape formed, initially by the bar to bar width delta and other distortions, and subsequently, by the implanted dummy pixels at pixel locations 228.

In some embodiments, at a step 4, processor 20 is configured to calculate one or more shape-correcting locations 230, such that when one or more dummy pixels 232 and 234 are implanted in respective images 202 and 204 at locations 230, the increased width of the implanted dummy pixels compensates for the trapeze distortion and converts the trapeze shape of images 202 and 204 to a rectangular or parallelogram shape. As shown at steps 3 and 4, the dummy pixels may be implanted as a bar of pixels along a section of a column of images 202 and 204. The implantation pixel bars will be described in more details in FIGS. 6 and 7 below.

Similarly to the sequence described at steps 1 and 2 above, processor 20 is configured to carry out steps 3 and 4 simultaneously. In other embodiments, steps 3 and 4 may be carried out sequentially, in the order described above, or in a reversed order. In the example embodiment of FIG. 2A the left end (e.g., ends 208 and 210) of images 202 and 204 is set as an anchor, whereas the right end (e.g., ends 222 and 224) of images 202 and 204 is moved due to the implantation so as to compensate for the bar to bar width delta causing the trapeze distortion and the wave Y(X).

In this embodiment, the shifts described at steps 1 and 2, and the implants described at steps 3 and 4 are performed from left to right. In other embodiments, the shifting and implanting steps may be carried out in any suitable direction, for example, at step 1 end 208 is shifted to the left side so as to be aligned with end 210.

Additionally or alternatively, the shifting and implanting steps may be carried out vertically at any suitable direction, so as to compensate for distortions. For example, the upper ends of images 202 and 204 may be aligned after steps 1 and 2, and the lower ends of images 202 and 204 are moved as a result of the dummy pixels implanting processes carried out at steps 3 and 4.

In alternative embodiments of steps 3 and 4, the dummy pixels may be implanted as a bar of pixels along a section of a row of images 202 and 204. Furthermore, the implanting of the bar of pixels described above, may be carried out along a section of a column and/or a row of the digital image, such that the compensation for the distortion may be carried out in one axis or in two axes (e.g., X and Y) simultaneously or sequentially.

In other embodiments, the pixels locations may be arranged using any other suitable configuration, for example, in a diagonal line geometry, or in a staircase.

In some embodiments, at a step 5 that concludes the process sequence for correcting the distortions in image 200, a set of scaling and shifting operations are carried out on images 202 and 204 so as to compensate for additional sources of wave X(Y) distortion and to align the magenta and cyan images relative to sheet 50 by correcting their displacements in Y axis (i.e., Im2SubY) and/or in X axis relative to sheet 50.

Figure 2B:
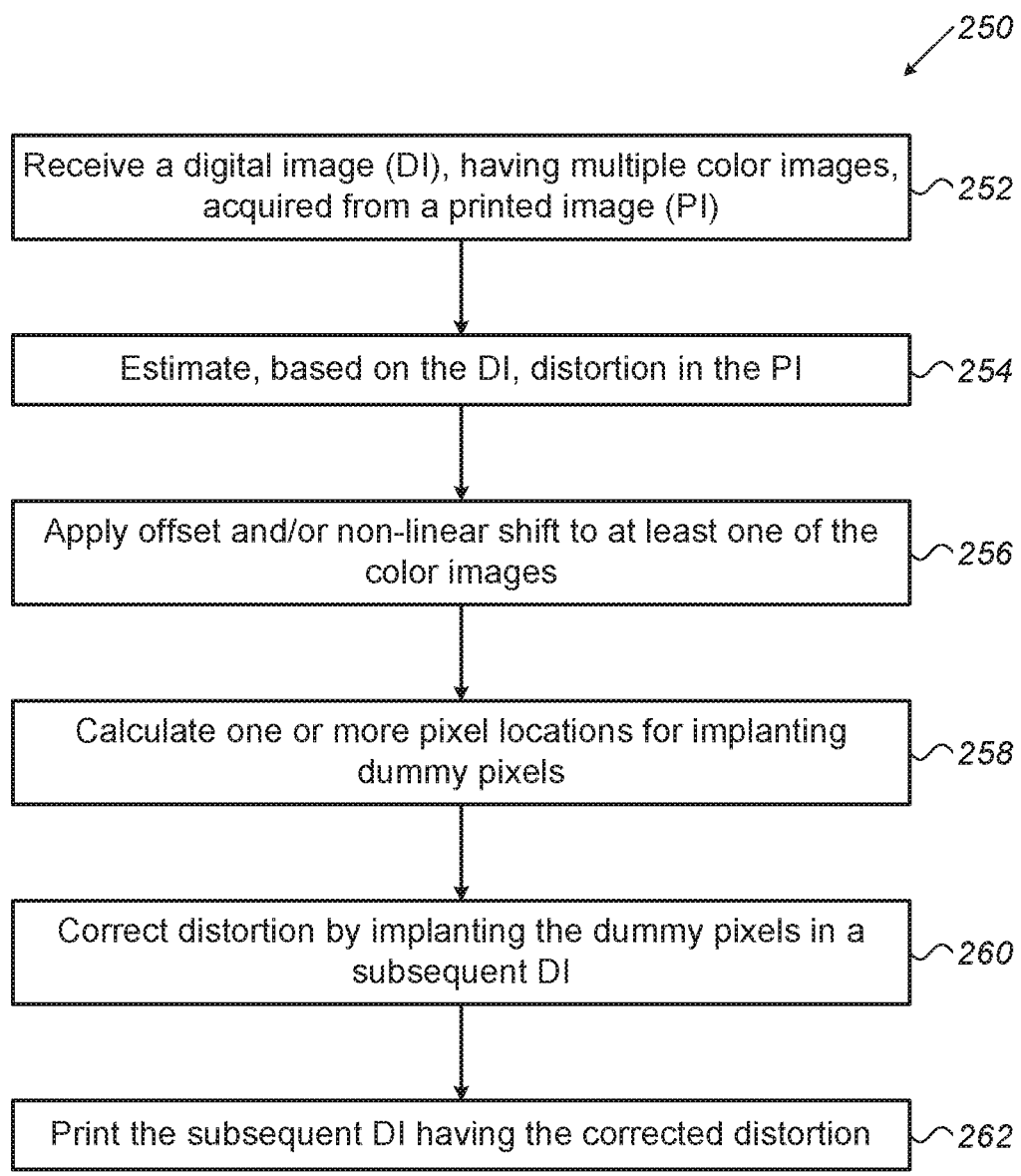
FIG. 2B is a flow chart that schematically illustrates a method for correcting distortions in digital printing, in accordance with an embodiment of the present invention.

FIG. 2B is a flow chart that schematically illustrates a method 250 for correcting distortions in digital printing, in accordance with an embodiment of the present invention. Method 250 begins at a digital image receiving step 252, with processor 20 receiving digital image 200, having color images 202 and 204, acquired from a printed image, which was printed by system 10 on sheet 50.

At a distortion estimation step 254, processor 20 estimates, based on digital image 200, a geometrical distortion in the printed image, as described in the raw image of FIG. 2A above. At a shifting step 256, processor 20 applies offset and/or non-linear shift to at least one of images 202 and 204, so as to align ends 208 and 210 with one another and to correct bar to bar Y position delta (and optionally other distortions), as described, respectively, in steps 1 and 2 of FIG. 2A above. Note that processor 20 is configured to carry out step 256 simultaneously or in two different steps (e.g., steps 1 and 2 of FIG. 2A above).

At a pixel location calculation step 258, processor 20 calculates one or more pixel locations (e.g., pixel locations 228 of FIG. 2A above) that, when one or more dummy pixels are implanted therein, compensate for the estimated geometric distortion. At a distortion correction step 260, processor 20 corrects the geometrical distortion by implanting the dummy pixels in a subsequent digital image. As described in steps 3 and 4 of FIG. 2A above, the dummy pixels may also be implanted as a bar of pixels along a section of a column of images 202 and 204.

At a printing step 262 that concludes method 250, system 10 receives printing instructions from processor 20 and prints the subsequent digital image having the corrected distortion, as described in step 5 of FIG. 2A above.

Figure 3:
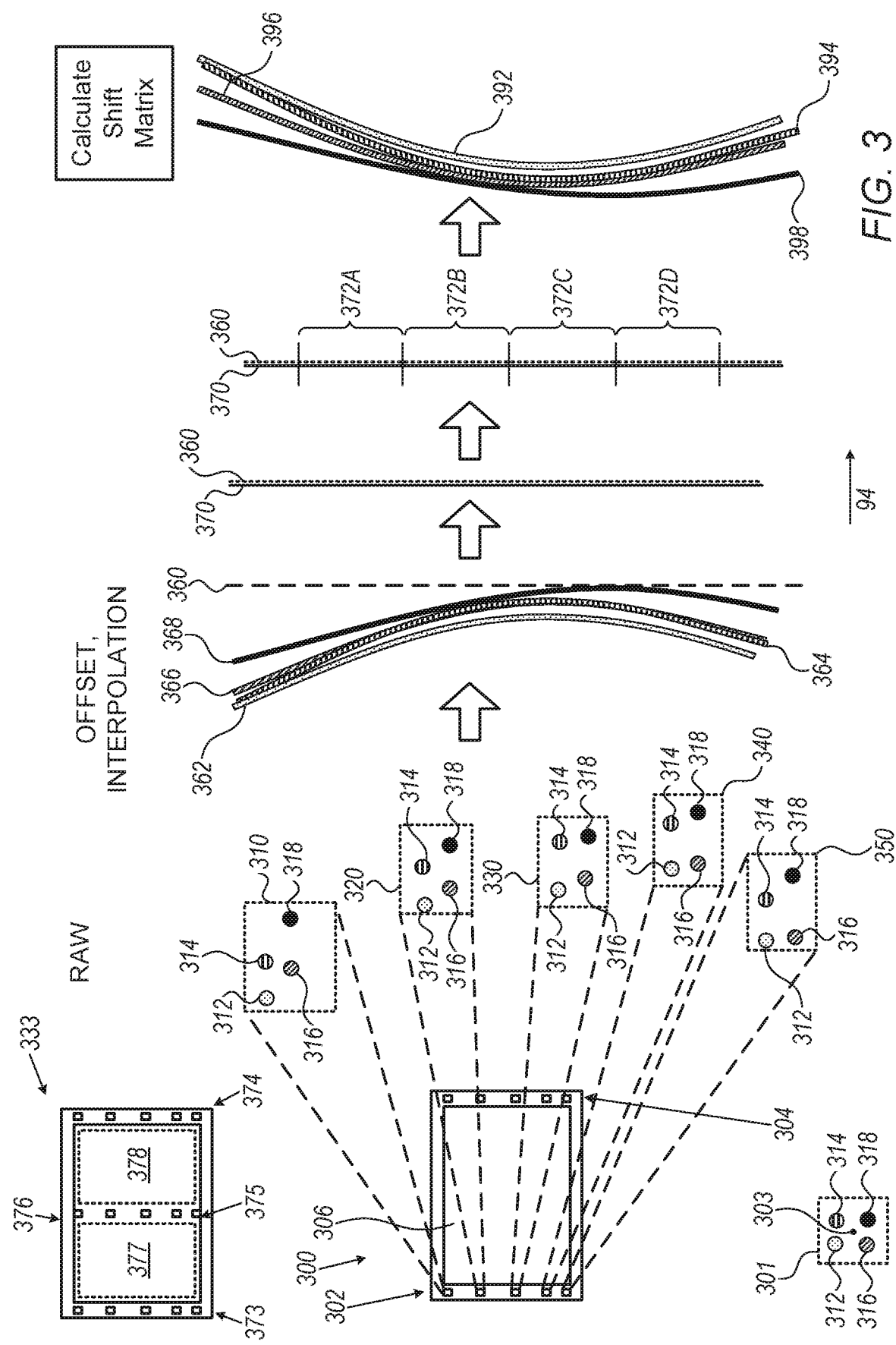
FIG. 3 is a schematic, pictorial illustration of a method for calculating a shift matrix in an image to be printed in a digital printing system, in accordance with an embodiment of the present invention.

FIG. 3 is a schematic, pictorial illustration of a method for calculating a shift matrix in an image 306 to be printed in system 10, in accordance with an embodiment of the present invention. Image 306 may replace, for example, image 42 of FIG. 1 above, and the method may replace steps 1 and 2 of FIG. 2A. In the example of FIG. 3, the term "right" is defined in the direction of arrow 94, and the term "left" is defined in the opposite direction.

The method begins with a printed frame 300, which comprises image 306 and testing sides 302 and 304 located adjacent to image 306, at the left and right margins of frame 300, respectively. In some embodiments, side 302 comprises five registration frames 310, 320, 330, 340 and 350 designed along testing side 302. In the example of FIG. 3, each registration frame comprises four registration marks 312, 314, 316 and 318 designed in four respective different colors, such as cyan (C), magenta (M), yellow (Y) and black (K). Note that a reference frame 301 represents the original design of the registration frames and marks of testing sides 302 and 306. In other embodiments, sites 302 and 306 may comprise any other suitable number of registration frames having, each, any suitable number of registration marks.

In some embodiments, frame 300 is printed on sheet 50 and subsequently, station 55 acquires and sends a digital format of frame 300 to processor 20 or to any other processor as described in FIG. 2A above. Note that frame 301 is not printed but only shown in FIG. 3 as a reference of the original design as described above. In the example of FIG. 3, black marks 318 are shifted more than all other mark, to the right, and marks 312 and 314 of frame 310 are shifted to the left.

In some embodiments, processor 20 inserts a constant offset to each registration mark so as to align marks 312, 314, 316 and 318 to a common position, e.g., at a center of gravity (COG) 303 of frame 301. Processor 20 is further configured to produce, based on the registration frames and registration marks, a set of interpolated curves between the respective marks of each color, for example between marks 312 of frames 310, 320, 330, 340 and 350.

As described above, in the design of the registration frames there is a deliberate shift between the registration marks so that they will not be printed on top of one another. In some embodiment, processor 20 is configured to align the location of all the registration marks of each frame to the common position per the predetermined graphics offset, and subsequently, to determine which registration mark is shifted (e.g., relative to the COG).

The interpolated curves are referred to herein as wave profile curves representing the shift distortion occurred during the printing for each respective color of system 10. The term "wave profile curve" is also referred to below simply as "curve" for brevity.

In the example of FIG. 3 processor 20 produces four curves corresponding to the four registration marks: a cyan curve 362, a magenta curve 364, a yellow curve 366 and a black curve 368. In some embodiments, processor 20 is configured to calculate the compensating shift of the curves relative to a shift edge pixel, also referred to herein as a reference curve 360. As shown in FIG. 3, during the printing process black curve 368 has a shifting distortion to the right more than all other curves, and cyan curve 362 has a left shifting distortion relative to all other curves.

As described in FIG. 2A above, the shifting steps are compensating for the wave Y(X) distortion caused, for example, by bar to bar position delta. In an embodiment, processor 20 may set a target reference for aligning all curves thereto. For example, reference curve 360 may serve as a target reference.

In another embodiment, processor 20 may shift all curves to align with the rightmost curve (e.g., curve 368 in the example of FIG. 3) as shown at step 1 of FIG. 2A.

In some embodiments, processor 20 is configured to calculate, for each color image, a shift matrix that compensates for the shift distortion caused during the printing to each respective curve. Processor 20 is further configured to divide curve 360 to multiple sections that serve as correction strips 372A-372D such that the shift matrix comprises the calculated shift for each of the correction strip. In an embodiment, processor 20 is configured to set and use any suitable number of correction strips, each strip 372 may have any suitable size, which may be similar to or different from the size of the other strips.

In the example of FIG. 3, the calculated shift matrix has four curves 392, 394, 396 and 398 corresponding to curves 362, 364, 366 and 368. Note that curves 392, 394, 396 and 398 of the calculated shift matrix are shaped like a mirror image of the distorted curves, i.e., curves 362, 364, 366 and 368.

As shown in FIG. 2A above, after applying the shift matrix left ends 208 and 210 of the cyan and magenta images are aligned with one another. In the example of FIG. 3, processor 20 is configured to calculate a left end 370, which represents all the left ends of the cyan, magenta, yellow and black images, aligned with one another and with reference curve 360.

In other embodiments, an alternative method may be used for calculating the shift matrix in an image 376 to be printed in system 10. Image 376 may replace, for example, image 306 of frame 300, or image 42 of FIG. 1 above, and the alternative method may replace the method described in FIG. 3 above and/or steps 1 and 2 of FIG. 2A. The alternative method may be carried out using a printed frame 333, which may be used, for example, instead of printed frame 300 described above, and/or images 202 and 204 of FIG. 2A above.

In some embodiments, printed frame 333 comprises image 376 and at least three testing columns 373, 374 and 375. In some embodiments, testing columns 373 and 374, which are located, respectively, at the left and right margins of frame 333, may replace, for example, testing sides 302 and 304, respectively. In some embodiments, columns 373 and 374 may comprise, each, multiple registration frames, such as registration frames 310, 320, 330, 340 and 350. As described above, each registration frame may comprise four registration marks 312, 314, 316 and 318 designed in four respective different colors, such as C, M, Y and K, or any other suitable number of registration marks having any suitable respective colors and arranged in the registration frames using any suitable configuration.

In some embodiments, registration frame 333 may comprise one or more additional testing columns, such as testing column 375, disposed within the interior of image 376. Testing column 375 may comprise multiple registration frames, such as registration frames 310, 320, 330, 340 and 350 described above. In the example of frame 333, testing column 333 may divide image 376 into two sections, a section 377 between testing columns 373 and 375, and a section 378 between testing columns 375 and 374.

In some embodiments, frame 333 is printed on sheet 50 and subsequently, station 55 or any other imaging apparatus, acquires and sends a digital format of frame 333, e.g., to processor 20, as described in FIG. 2A above. Based on testing column 373, processor 20 inserts a constant offset to each registration mark so as to align marks 312, 314, 316 and 318, e.g., to COG 303. In addition, processor 20 produces, based on the registration frames and registration marks of testing column 373, a set of wave profile curves between the respective marks of each color.

In such embodiments, the wave profile curves represent the shift distortion occurred within section 377, during the printing of each color of system 10. Similarly, and using the same techniques, processor 20 produces, based on the registration frames and registration marks of testing column 375, a set of wave profile curves representing the shift distortion occurred for each color within section 378. In other words, by increasing the frequency of registration frames and marks within frame 333, processor 20 may increase the number of the produced wave profile curves. In the example of frame 300, processor 20 produces one set of profile curves 362, 364, 366 and 368 for the entire area of image 306. In the example of frame 333, however, by having testing column 375 processor 20 may improve the distortion correction resolution within image 376, by producing two respective sets of wave profile curves (such as curves 362, 364, 366 and 368) and two respective shift matrices (such as curves 392, 394, 396 and 398) for sections 377 and 378 of image 376.

The configuration of frame 333 is provided by way of example, in order to illustrate certain problems, such as correcting distortion in image printing, which are addressed by embodiments of the present invention and to demonstrate the application of these embodiments in enhancing the performance of system 10. Embodiments of the present invention, however, are by no means limited to this specific sort of example digital printing system, and the principles described herein may similarly be applied to other sorts of digital printing systems.

In other embodiments, frame 333 may comprise additional registration frames, such as registration frame 310, which may be disposed in image 376 using any suitable arrangement. In an example embodiment, frame 333 may comprise additional testing columns, such as testing column 375, disposed within the interior of image 376. For example, by having testing columns 373 and 374 at the left and right margins, and three testing columns disposed within the interior of image 376, processor 20 may produce four sets of wave profile curves and shift matrices for respective sections of image 376.

In other embodiments, frame 333 may comprise, in addition to or instead of any of testing columns 374-376, multiple registration frames, such as registration frame 310, which may be arranged across image 376 and the margins thereof, using any suitable configuration. In such embodiments, processor 20 may divide frame 333 to any suitable number of sections and may produce sets of wave profile curves and shift matrices for the respective number of sections of image 376.

Figure 4:
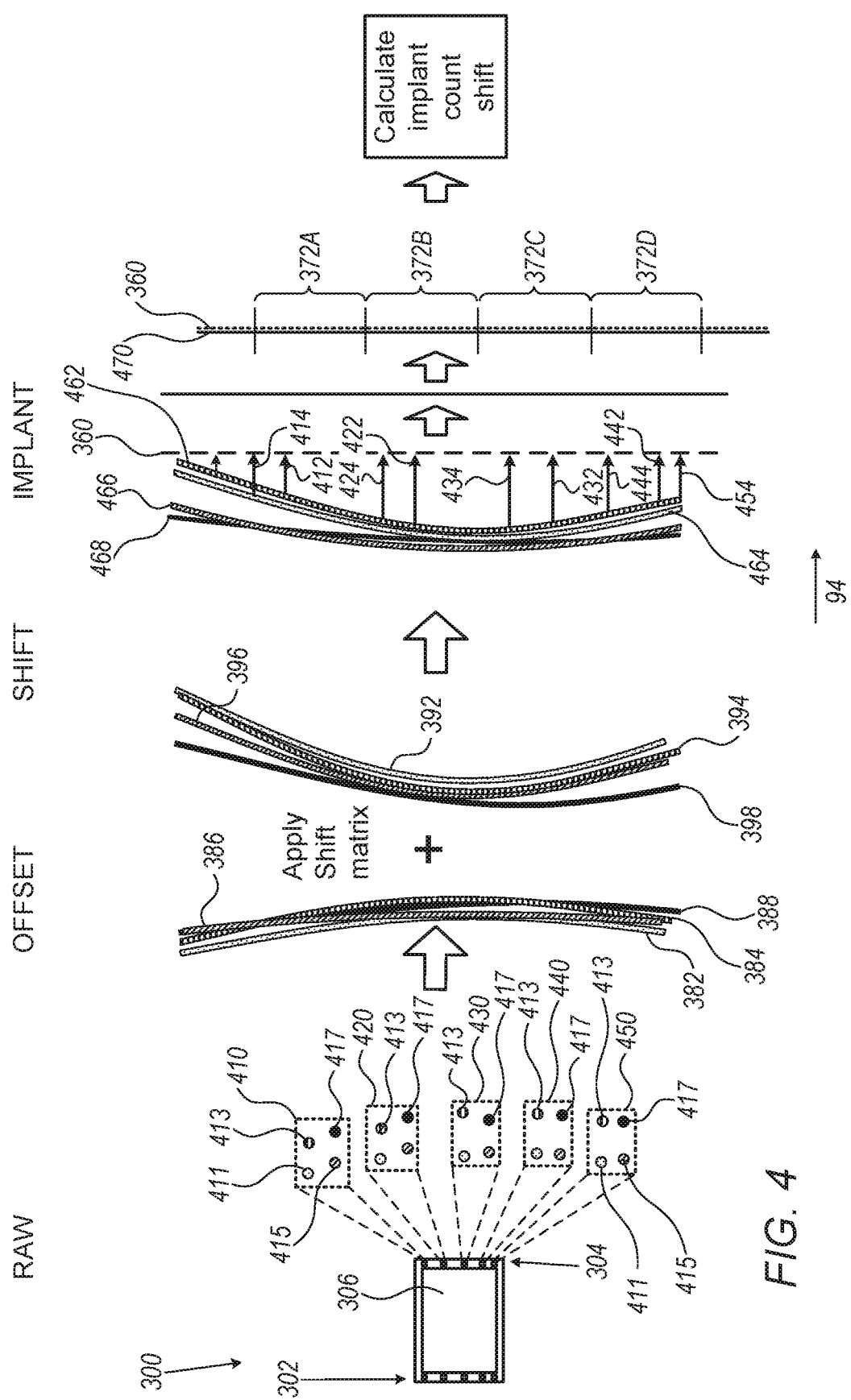
FIG. 4 is a schematic, pictorial illustration of a method for calculating a count matrix for implanting dummy pixels in an image to be printed in a digital printing system, in accordance with an embodiment of the present invention.

Correcting Wave Y(X) and Trapeze Distortions by Implanting Dummy Pixels at Predefined Pixel Locations FIG. 4 is a schematic, pictorial illustration of a method for calculating a count matrix for implanting dummy pixels in image 306, in accordance with an embodiment of the present invention. The method described in FIG. 4 corresponds to step 3 of FIG. 2A above.

In some embodiments, the method begins with acquiring raw positions of registration frames 410, 420, 430, 440 and 450 located at side 304. Note that the raw positions are acquired by station 55 together with the acquisition of the corresponding frames of side 302 (e.g., frames 310, 320, 330, 340 and 350). Each frame of side 304 comprises marks 411, 413, 415 and 417 corresponding, by design, to marks 312, 314, 316 and 318 of registration frames 310, 320, 330, 340 and 350.

In some embodiments, processor 20 inserts a constant offset to each registration mark so as to align marks 411, 413, 415 and 417 to a common position using the same techniques described in FIG. 3 above. Subsequently, processor 20 produces, based on the registration frames and registration marks, a set of interpolated curves 382, 384, 386 and 388 (corresponding to curves 362, 364, 366 and 368 of FIG. 3 above) between the respective marks of each color.

In some embodiments, processor 20 applies the calculated shift matrix to curves 382, 384, 386 and 388 so as to calculate respective wave profile curves 462, 464, 466 and 468 of the respective cyan, magenta, yellow and black images. Note that the applied shift matrix was calculated based on the registration frames of left end 302, and is applied to the registration frames of right end 306.

As shown at step 3 of FIG. 2A above, processor 20 is configured to calculate for each color image respective pixel locations (e.g., locations 228), such that when one or more dummy pixels are implanted in locations 228, the increased width of the respective features at locations 228 compensates for the estimated geometric distortion of the respective color. In other words, the wave Y(X) and trapeze distortions are compensated by implanting the dummy pixels at the respective pixel locations. In an embodiment, the color of the dummy pixels and the size of the droplets may be defined based on a closest neighbor (e.g., one pixel left) to pixel location 228. As described above, the shift and the implant are calculated separately for each color. In some embodiments, each pixel has several levels that determine the size of the actual droplet, thus, the width of the printed feature. For example, controller 54 may feed into station 60 an input waveform of two bits that defines four levels for each pixel: no droplet (e.g., level zero), a single droplet forming a narrow pixel (e.g., level 1), two droplets forming a pixel having a medium width (e.g., level 2) and a wide pixel formed by three droplets (e.g., level 3). This embodiment is depicted in more details in FIG. 5 below.

In some embodiments, after applying the calculated shift matrix processor 20 identifies, based on the shape of each color image, which print bar 62 of a given color is jetting droplets that eventually print the largest bar width. In these embodiments, the image having the largest print bar width may serve as a reference for all other colors that will be corrected to align with the image of the given color. In other words, the implanted dummy pixels compensate for the bar to bar width delta, thus, compensating for the wave Y(X) and trapeze distortions as well as for other local distortions.

In other embodiments, processor 20 is configured to compensate for the distortion in the digital image (e.g., image 306) by removing pixels from the digital image instead of or in addition to implanting the dummy pixels in the respective digital image.

In other embodiments, processor 20 is configured to identify other distortions, such as bar to bar Y position delta as well as any local distortion. Processor 20 is configured to align all color images by implanting the dummy pixels at the calculated pixel locations. In the example of FIG. 4, all wave profile curves 462, 464, 466 and 468 are distorted. In an embodiment, dummy pixels are implanted at the respective calculated pixel locations of each color image.

For example, in the cyan image that is represented by curve 462, processor 20 is configured to calculate pixel locations that, when one or more dummy pixels are implanted therein, compensate for the geometric distortion of curve 462 relative to curve 360. The geometric distortions in the cyan image are represented by arrows 412, 422, 432 and 442, and are corrected by implanting the one or more dummy pixels at the respective pixel locations. Similarly, arrows 414, 424, 434 444 and 454 show the distortion in the magenta image represented by curve 464.

In some embodiments, the pixel locations are calculated for each of correction strips 372A-372D. As shown in FIG. 4, after applying the calculated shift matrix, the distortion at strips 372B and 372C are larger compared to the distortions at strips 372A and 372D, For example, arrows 422 and 424 of strip 372B are larger than arrows 412 and 414 of strip 372A. Thus, the density of implanted dummy pixels will be larger at strips 372B and 372C compared to the density of implanted dummy pixels at strips 372A and 372D.

In some embodiments, after implanting the dummy pixels, curves 462, 464, 466 and 468 are aligned with curve 360 and appear as a merged as a calculated left end 470. As described in FIG. 2A above, step 2 of FIG. 4 aligns all color images, thereby shaping all images as similar trapezes, and step 4 compensates for the trapeze distortion by implanting dummy pixels in all color images.

As described for frame 333 shown in FIG. 3 above, processor 20 is configured to produce two sets of wave profile curves (such as curves 362, 364, 366 and 368) and two shift matrices (such as curves 392, 394, 396 and 398) for sections 377 and 378, respectively. In some embodiments, processor 20 is configured to produce, based on the registration frames and registration marks of test columns 374 and 375, two sets of interpolated curves, such as interpolated curves 382, 384, 386 and 388 between the respective marks of each color. For the sake of conceptual clarity, the two sets of interpolated curves are referred to herein as first and second sets of interpolated curves, and the two shift matrices are referred to herein as first and second shift matrices, such that the first shift matrix corresponds to the first set of interpolated curves calculated for section 377, and the second shift matrix corresponds to the second set of interpolated curves calculated for section 378.

In some embodiments, processor 20 applies the first calculated shift matrix (such as curves 392, 394, 396 and 398) to the first set of interpolated curves (such as curves 382, 384, 386 and 388), so as to calculate respective first set of wave profile curves (such as profile curves 462, 464, 466 and 468) of the respective C, M, Y and K images of section 377. Similarly, processor 20 applies the second calculated shift matrix to the second set of interpolated curves, so as to calculate respective second set of wave profile curves of the respective C, M, Y and K images of section 378.

Note that the first shift matrix that was produced for correcting section 377, was calculated based on the registration frames of testing columns 373, and is applied to the registration frames of testing columns 375. Similarly, the second shift matrix that was produced for correcting section 378, was calculated based on the registration frames of testing columns 375, and is applied to the registration frames of testing columns 374.

In some embodiments, as described at step 3 of FIG. 2A above, processor 20 is configured to calculate for each color image of sections 377 and 378, two respective sets of pixel locations (e.g., locations 228 of FIG. 2A), referred to herein as first and second sets of pixel locations, respectively. In such embodiments, when one or more dummy pixels are implanted in the first and second sets of pixel locations, the increased width of the respective features at the first and second sets of pixel locations, compensates for the estimated geometric distortion of the color images of sections 377 and 378, respectively.

As described above for frame 300, the geometric distortions in the CMYK images are corrected by implanting the one or more dummy pixels at the respective pixel locations. In an example embodiment of frame 333, the first and second sets of geometric distortions are produced in the CMYK images of sections 377 and 378, respectively. The first and second sets of geometric distortions are corrected by implanting the one or more dummy pixels at the first and second pixel locations, respectively.

In some embodiments, by dividing image 376 to multiple sections, such as sections 377 and 378, processor 20 may improve the resolution of the geometric distortion estimation (as described in FIG. 3 above). In addition, processor 20 may improve the resolution of the correction by applying, for sections 377 and 378, respectively, the first and second shift matrices, and by implanting the one or more dummy pixels at the first and second pixel locations, respectively.

FIG. 5 is a schematic, pictorial illustration of a process sequence for implanting dummy pixels in a cyan digital image 500 to be printed in system 10, in accordance with an embodiment of the present invention. For the sake of clarity, the sequence described herein is carried out for a single color image, e.g., cyan, but in real-life printing, the estimated distortion and the pixel locations are calculated separately for each color image. Subsequently, the physical implantation of the dummy pixel is typically carried out simultaneously in all color images.

In some embodiments, the pixel locations can be similar for all colors images in case of a need to compensate for effects that are common to all color images.

The sequence begins at a step 1 with an original version of cyan digital image 500 (also referred to herein as a source image) having cyan pixels 502 arranged, for example, in an "O" shape at the center of image 500. As described in the process sequence of FIG. 2A above, station 55 acquires a digital image of a printout of original digital image 500 and, as shown in FIG. 3. Subsequently, processor 20 estimates the geometrical distortion and calculates the shift matrix required for each color. Image 500 may be a subset of any digital image, such as image 42 of FIG. 1 above.

At a step 2 (note that this is a different step 2 from the step 2 described in FIG. 2 above), processor 20 calculates the pixel locations that, when one or more dummy pixels are implanted therein, compensate for the estimated geometric distortion described above. In the example of FIG. 5, the pixel locations, such as locations 504, 506 and 514, are filled with an "XX" pattern. As described in FIG. 2A above, each dummy pixel is shifting the pixels located, at the same row, to the right of the respective pixel location. In the example of FIG. 5, the shift to the right is represented by the direction of an arrow 520 and a left direction is opposite to the direction of arrow 520. Thus, for a given pixel location, the pixels located at the same row, to the right of the given pixel location, are shifted by one pixel in the direction of arrow 520.

For example, a dummy pixel that will be implanted at location 506 will shift two cyan pixels 512 and two cyan pixels 510 of the same row, by one pixel location to the right. Similarly, a dummy pixel that will be implanted at location 514 will shift two cyan pixels 516 of the same row, by one pixel location to the right. Note that two cyan pixels 512 are located left of location 514, and therefore will not be affected by the implantation in location 514 and will remain in their original location shown in image 500 of step 1.

At a step 3 that corresponds to step 3 of FIG. 2A above, the dummy pixels are implanted at the respective pixel locations shown at step 2. In the example of FIG. 5, most of the calculated pixel locations are at the upper part of the cyan image, therefore, a frame 530 that represents the shape of the cyan image after the dummy pixel implantation has a trapeze shape.

As described above, the color of each implanted dummy pixel is determined by processor 20 and/or controller 54 based on any suitable algorithm. For example, the color and the width may be similar to the nearest neighbor pixel located, at the same row, one position to the left of the dummy pixel location. Therefore, in the example of cyan image 500, the pixels will have the droplet size value defined by the level of the waveform as described in FIG. 4 above. For example, the dummy pixels at locations 504 will have a cyan color, therefore, each pixel will receive a waveform having a level between 1 and 3 in accordance with the width of the nearest neighbor. The dummy pixels implanted at locations 506 and 514 do not have a cyan neighbor and therefore will have a waveform of level zero. The same calculation repeats for each color image.

Step 3 concludes the distortion correction of the cyan image and carried out in a similar manner for all other colors. As described at step 4 of FIG. 2A above, in order to compensate for the common trapeze shape of all color images, processor 20 calculates one or more shape-correcting locations, such that implanting one or more dummy pixels therein compensates for the trapeze shape of frame 530 and shapes the image of step 3 to a rectangular or parallelogram shape. In the example of FIG. 2A, calculated shape-correcting locations 230 are located mostly at the lower part of the trapeze-shaped image. The shape of image 500 at step 3 of FIG. 5 is similar to the shape of image 200 at step 3 of FIG. 2A above. Therefore, at a shape-correcting step (not shown) of image 500, the lower part will have more pixel locations than in the upper part.

FIG. 6 is a schematic, pictorial illustration of a method for setting pixel locations in a digital image 600 to be printed in system 10, in accordance with an embodiment of the present invention. Image 600 may replace, for example, image 500 of FIG. 5 above. In the example of FIG. 6, digital image 600 covers a portion of the printable width as supported by system 10.

In some embodiments, processor 20 is configured to set the pixel locations at predefined locations with respect to the estimated geometric distortion, implemented, for example, using a lookup table (LUT). In an example embodiment of FIG. 6, the predefined locations are calculated in percentage of valid width 612 set from a left end 614 (also referred to herein as a left edge) of the valid width. For example, a single location at strip 608 is set at 50% of valid width 612 as shown by an arrow 660. Processor 20 sets two pixel locations 610 and 630 at 25% and 50% of width 612, respectively, as shown by respective arrows 662 and 664. Similarly, at strip 604, pixel locations 610, 630 and 640 are set respectively at 25%, 50% and 75% of width 612, wherein pixel location 640 is shown by an arrow 666. Strip 602 comprises four pixel locations 610, 620 (represented by an arrow 668), 630 and 640, set respectively at 25%, 42%, 50% and 75% of valid width 612.

In some embodiments, setting the pixel location as percentage of the valid width allows applying the same pixel locating algorithm for any valid width caused by the width of the digital image, and thus, the difference between the respective digital image and sheet 50. In other embodiments, the calculated positions of the pixel locations and the method determining thereof may be carried out using any other suitable technique (e.g., not necessarily same locations for all colors).

Figure 7:
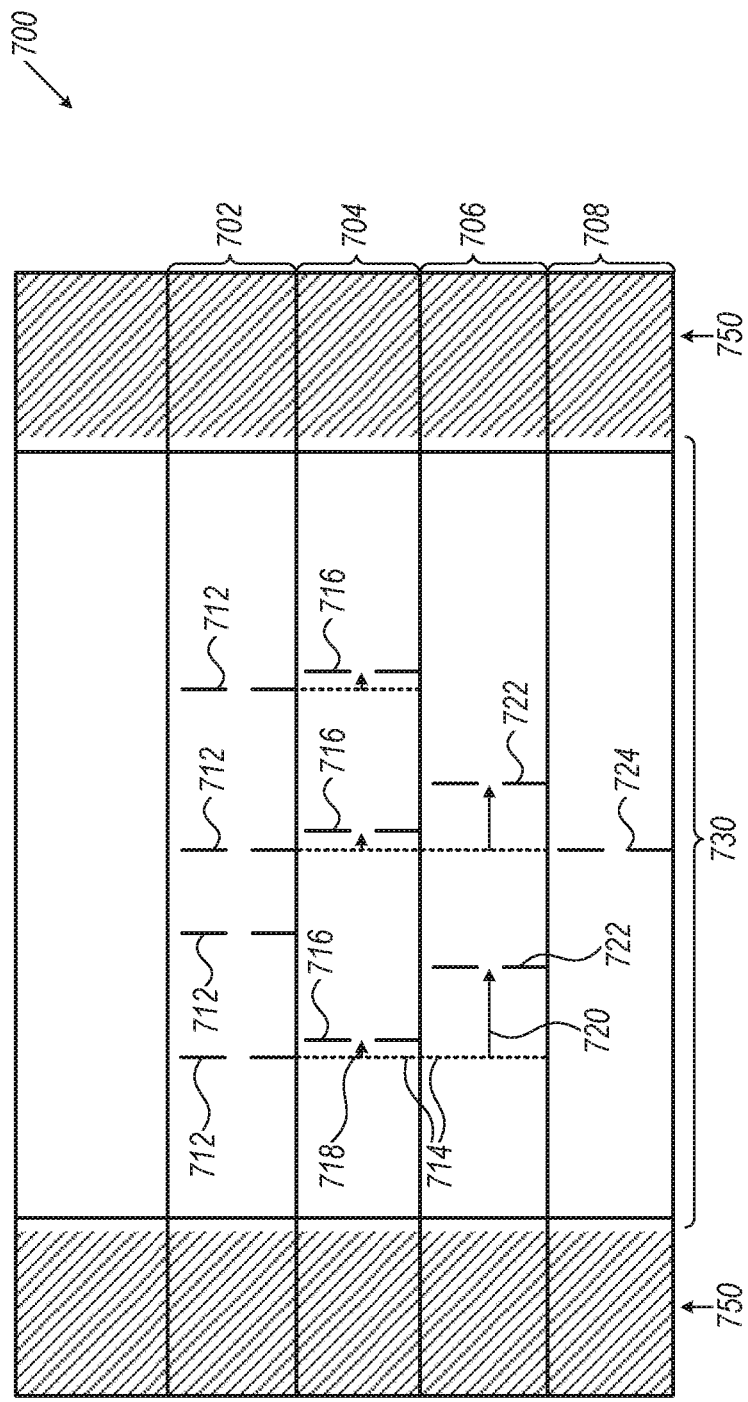
FIG. 7 is a schematic, pictorial illustration of a method for setting pixel locations in a digital image to be printed in a digital printing system, in accordance with another embodiment of the present invention.

FIG. 7 is a schematic, pictorial illustration of a method for setting pixel locations in a digital image 700 to be printed in system 10, in accordance with another embodiment of the present invention. Image 700 may replace, for example, image 500 of FIG. 5 above. In the example of FIG. 7, processor 20 sets non-printable areas 750, a valid width 730 of image 700 on sheet 50, and correction strips 702, 704, 706, and 708 having, respectively, four, three, two and one pixel locations.

In some embodiments, the position of the pixel locations may be constant at each strip but different between the strips, using a method referred to herein as a semi-random algorithm. For example, in strips 702 and 708 the respective positions of the pixel locations 712 and 724 are set in accordance with the LUT described in FIG. 6 above. In strip 704, pixel locations 716 are shifted relative to a vertical dashed line 714, which is aligned with location 712, by a predefined distance marked by an arrow 718. In an embodiment, the same shift is repeated in the position of all pixel locations 716 of strip 704.

In some embodiments, a different shift relative to line 714, is carried out in strip 706. In these embodiments, pixel locations 722 are shifted by another predefined distance illustrated by an arrow 720. In other embodiments, processor 20 may determine any other suitable direction of the predefined shift, for example, in a direction opposite to arrow 720.

The method described in FIG. 7 is not limited to the embodiments depicted above. In other embodiments, processor 20 is configured to apply any other suitable method for setting the position of each pixel location. For example, processor 20 is configured to set a shift distance that may vary along the respective strip. Additionally or alternatively, the strips having shifts may be selected systematically, e.g., alternately, or randomly.

Figure 8:
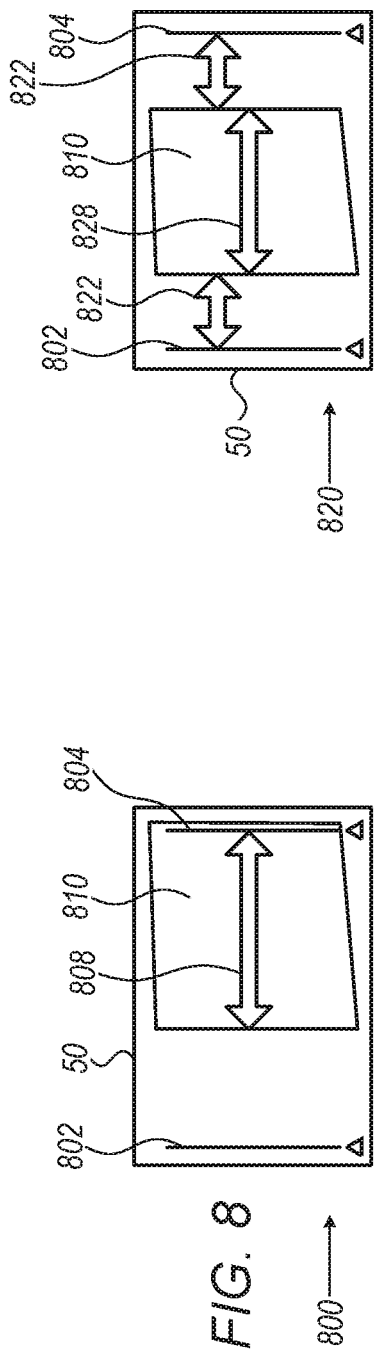
FIG. 8 is a schematic, pictorial illustration of a method for aligning an implanted image to be printed in a digital printing system, in accordance with an embodiment of the present invention.

FIG. 8 is a schematic, pictorial illustration of a method for aligning an implanted image 810 with sheet 50, in accordance with an embodiment of the present invention. In some embodiments, a frame 800 comprises respectively, left and right ends 802 and 804 of sheet 50, and implanted image 810, which may replace, for example image 500 of FIG. 5 above. As shown in frame 800, as a result of the implanted dummy pixels, image 810 has a width illustrated by a double-headed arrow 808, which is larger than the specified width in the original design of the digital image, and is also shifted to the right. Thus, image 810 is not centered relative to sheet 50, referred to above as image to substrate Y (Im2SubY), and may even cross over right end 804 of sheet 50 as shown in the example of frame 800.

Reference is now made to a frame 820. In some embodiments, processor 20 is configured to scale the size, e.g., width, of image 810 to the specified width of the original digital image, which is illustrated by a double-headed arrow 828. Processor 20 is further configured to center image 810 relative to sheet 50, by setting predefined non-printable areas having a specified width, illustrated by double-headed arrows 822.

In some embodiments, processor 20 (or any other processor coupled to or integrated with system 10) is configured set the width of image 810 by scaling the synthetic color image. The processor is further configured to center image 810 by shifting image 810 relative to sheet 50. Additionally or alternatively, the processor is configured to modify mechanically controlled parameters, e.g., moving the loading position of sheet 50 along the Y axis. Note that in some cases, it may be required, by design, to position the COG of the digital image at a predefined shift relative to the COG of sheet 50. In an embodiment, processor 20 is configured to set uneven non-printable areas between the edges of the digital image (e.g., image 810, or frame 820) and sheet 50.

In some embodiments, the methods described above may be applied, for example, in duplex printing systems in case of misalignment between images printed on different sides of the same sheet.

In some embodiments, system 10 may be defined as processor 20 and a printing subsystem, which represents all the other parts, modules and stations of system 10 but processor 20. In these embodiment, processor 20 is configured to estimate the geometric distortion and to calculate the pixel locations so as to correct the distortion by forming the subsequent digital image, and the printing subsystem is configured to print the subsequent digital image having the corrected geometric distortion.

Although the embodiments described herein mainly address correcting distortions in digital printing on sheets, the methods and systems described herein can also be used in other digital printing applications, such as in digital printing on a continuous web and/or a long print which contains a larger number of registration marks and/or registration frames.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method for correcting distortion in image printing, the method comprising:
   receiving a digital image acquired from a printed image;
   estimating, based on the digital image, a geometric distortion having a wave-shaped pattern of features formed in the printed image along both a first axis and a second axis, different from the first axis;
   calculating one or more pixel locations that, when multiple dummy pixels are implanted along both the first axis and the second axis, compensate for the wave-shaped pattern of the estimated geometric distortion along both the first and second axes;
   correcting the geometric distortion in a subsequent digital image to be printed, by implanting the dummy pixels at the one or more calculated pixel locations along the first and second axes in the subsequent digital image; and
   printing the subsequent digital image having the corrected geometric distortion.

2. The method according to claim 1, wherein implanting the dummy pixels at a calculated pixel location comprises shifting one or more existing pixels, along one or both of the first and second axes, at a given pixel location by an amount of the implanted dummy pixels.

3. The method according to claim 2, wherein at least one of the pixel locations comprises a bar of pixels along a section of a column or row of the digital image, and wherein correcting the geometrical distortion comprises implanting the dummy pixels in the bar.

4. The method according to claim 2, wherein the digital image comprises at least first and second colors, wherein the wave-shaped pattern comprises: (a) a common wave to at least the first and second colors, (b) a first wave in the first color, and (c) a second wave in the second color, and wherein correcting the geometric distortion comprises correcting the common wave and the first wave in the first color, and the common wave and the second wave in the second color.

5. The method according to claim 2, wherein compensating for the wave-shaped pattern forms a trapeze shape distortion of a print of the digital image, and comprising correcting the geometric distortion by compensating for the trapeze shape.

6. The method according to claim 2, and comprising, based on the digital image, estimating at least an additional geometric distortion of the printed image relative to a source image used for printing the printed image.

7. The method according to claim 6, wherein the additional geometric distortion comprises a tilt of the printed image relative to the source image, and comprising correcting the tilt by applying, to the source image, a pre-compensation for the tilt.

8. The method according to claim 6, wherein the additional geometric distortion comprises a color to color position difference between first and second colors of the printed image, and comprising correcting the color to color position difference by shifting, in the subsequent digital image, at least one of the first and second colors.

9. The method according to claim 2, wherein the digital image comprises multiple color images, wherein implanting the dummy pixels comprises, for a given dummy pixel at a given pixel location in a given color image, setting a waveform that determines a size of the given dummy pixel based on one or more selected pixels adjacent to the given pixel location, and wherein printing the subsequent digital image comprises printing the given dummy pixel in accordance with the waveform.

10. An apparatus for correcting distortion in image printing, the apparatus comprising:
an interface, which is configured to receive a digital image acquired from a printed image; and
a processor, which is configured to:
estimate, based on the digital image, a geometric distortion having a wave-shaped pattern of features formed in the printed image along both a first axis and a second axis, different from the first axis;
calculate one or more pixel locations that, when multiple dummy pixels are implanted along both the first axis and the second axis, compensate for the wave-shaped pattern of the estimated geometric distortion along both the first and second axes; and
correct the geometric distortion in a subsequent digital image to be printed, by implanting the dummy pixels at the one or more calculated pixel locations along the first and second axes in the subsequent digital image.

11. The apparatus according to claim 10, wherein the processor is configured to shift one or more existing pixels, along one or both of the first and second axes, at a given pixel location by an amount of the implanted dummy pixels.

12. The apparatus according to claim 11, wherein at least one of the pixel locations comprises a bar of pixels along a section of a column or row of the digital image, and wherein the processor is configured to correct the geometrical distortion by implanting the dummy pixels in the bar.

13. The apparatus according to claim 11, wherein the digital image comprises at least first and second colors, wherein the wave-shaped pattern comprises: (a) a common wave to at least the first and second colors, (b) a first wave in the first color, and (c) a second wave in the second color, and wherein the processor is configured to correct the geometrical distortion by correcting: (i) the common wave and the first wave in the first color, and (ii) the common wave and the second wave in the second color.

14. The apparatus according to claim 11, wherein compensating for the wave-shaped pattern forms a trapeze shape distortion of a print of the digital image, and wherein the processor is configured to correct the geometrical distortion by compensating for the trapeze shape.

15. The apparatus according to claim 11, wherein the processor is configured to estimate, based on the digital image, at least an additional geometric distortion of the printed image relative to a source image used for printing the printed image.

16. The apparatus according to claim 15, wherein the additional geometric distortion comprises a tilt of the printed image relative to the source image, and wherein the processor is configured to correct the tilt by applying, to the source image, a pre-compensation for the tilt.

17. The apparatus according to claim 15, wherein the additional geometric distortion comprises a color to color position difference between first and second colors of the printed image, and wherein the processor is configured to correct the color to color position difference by shifting, in the subsequent digital image, at least one of the first and second colors.

18. The apparatus according to claim 11, wherein the digital image comprises multiple registration marks, and wherein the processor is configured to estimate the geometric distortion by analyzing the geometric distortion between the registration marks.

19. The apparatus according to claim 18, wherein the digital image comprises registration marks in at least one of: (i) a margin of the digital image and (ii) an interior of the digital image.

20. A printing system, comprising:
a printing subsystem comprising an intermediate transfer member (ITM) configured to receive ink droplets from an image forming station to form an ink image thereon, and to form a printed image by transferring the ink image to a target substrate; and
a processor, which is configured to:
receive a digital image acquired from the printed image;
estimate, based on the digital image, a geometric distortion having a wave-shaped pattern of features formed in the printed image along both a first axis and a second axis, different from the first axis;
calculate one or more pixel locations that, when multiple dummy pixels are implanted along both the first axis and the second axis, compensate for the wave-shaped pattern of the estimated geometric distortion along both the first and second axes; and
correct the geometric distortion in a subsequent digital image to be printed, by implanting the dummy pixels at the one or more calculated pixel locations along the first and second axes in the subsequent digital image,
wherein the printing subsystem is configured to print the subsequent digital image having the corrected geometric distortion.

* * * * *